United States Patent [19]

Uekita et al.

[11] Patent Number: 4,740,396

[45] Date of Patent: Apr. 26, 1988

[54] PROCESS FOR FORMING FILM

[75] Inventors: Masakazu Uekita; Hiroshi Awaji, both of Kobe, Japan

[73] Assignee: Kanegafuchi Kagaku Kogyo Kabushiki Kaisha, Osaka, Japan

[21] Appl. No.: 10,502

[22] Filed: Feb. 3, 1987

[30] Foreign Application Priority Data

Feb. 4, 1986 [JP] Japan .................................. 61-23278

[51] Int. Cl.$^4$ ............................................... B05D 1/20
[52] U.S. Cl. ................................. 427/434.3; 427/430.1
[58] Field of Search .............................. 118/402, 403; 427/430.1, 434.3

[56] References Cited

U.S. PATENT DOCUMENTS 4,632,800  12/1986  Barraud et al. .................. 427/434.3
4,643,125   2/1987  Barlow et al. ................... 427/434.3

OTHER PUBLICATIONS

European Search Report from EP 87 10 1419.
*Thin Solid Films*, vol. 134, 1985, pp. 67–74, Elsevier Sequoia, NL; S. Hirota et al.; "Polymerization and Optical Properties of Mixed LB Films of Beta-Parinaric Acid and Stearic Acid".

*Primary Examiner*—Shrive P. Beck
*Attorney, Agent, or Firm*—Armstrong, Nikaido, Marmelstein & Kubovcik

[57] ABSTRACT

A process for forming a built-up thin film of a high polymer which is inherently difficult of film formation by the Langmuir-Blodgett process. A high polymer is modified so as to enable film formation by the Langmuir-Blodgett process by introducing a substituent group for imparting a hydrophobic nature to a recurring unit of the high polymer, and the thus-modified high polymer is mixed with a known Langmuir-Blodgett film compound for film formation by the Langmuir-Blodgett process. A high polymer used in the present invention includes linear recurring units each of which is composed of an at least divalent first organic group $R_1$ having at least two carbon atoms and an at least divalent second organic group $R_2$ having at least two carbon atoms, the first organic group $R_1$ and the second organic group $R_2$ being connected with each other by a divalent bonding group; and at least one hydrocarbon-containing group $R_3$ which have 10 to 30 carbon atoms and optionally contain a substituent group, and which is covalently bonded to the same recurring units.

24 Claims, 17 Drawing Sheets

PROCESS FOR FORMING FILM

BACKGROUND OF THE INVENTION

1. Field of the Invention

The present invention relates to a process for forming a film of a high polymer and, more particularly, to a process for forming a film of a modified high polymer by the Langmuir-Blodgett process.

2. Description of the Prior Art

It was found by Langmuir and Blodgett in 1930s that fatty acids having ca. 16 to 22 carbon atoms can form a monomolecular film on the surface of water and such a film can be built up or laminated on a substrate. However, it is only recent years that investigation of their technical application was started.

The outline of investigations hitherto made has been reviewed in "Kotai Butsuri (Physics of Solids)," 17 (12), p. 45 (1982); "Thin Solid Film," 68, No. 1 (1980); ibid., 99, Nos. 1, 2 and 3 (1983); G. L. Gains, "Insoluble Monolayers to Liquid-gas Interface," Interscience Publishers, New York (1966); etc. However, the conventional Langmuir-Blodgett films (hereinafter referred to as "LB film") of straight chain saturated carboxylic acids are not satisfactory in such points as heat resistance and mechanical strength and, so there is a problem that they can find no practical application as they are.

In order to rectify the above disadvantages, investigations have been made on polymetric films of unsaturated fatty acids, such as ω-tricosenic acid, ω-heptadecenic acid and α-octadecylacrylic acid; and unsaturated esters of fatty acids, such as vinyl stearate, octadecyl acrylate; as well as derivatives of diacetylene. Those films, however, are not sufficiently heat-resistant and have only poor electrical properties. It is also known that some hydrophilic group-containing polymers, such as polyacrylic acids, polyvinyl alcohols, polyethyl acrylates and polypeptides, also have film-forming properties. However, any sort of modified high polymer suitable for LB materials has not as yet been investigated, and there are no excellent materials for LB film worthy of the name.

On the other hand, heat-resistant films have been produced from polyimides. However, polyimide films prepared by the spin coat method or the like usually have a thickness greater than 1 μm, or at best 1,000 Å. It is therefore very difficult to produce a heat-resistant film having a thickness of 1,000 Å or less and, at the same time, free from pin holes.

SUMMARY OF THE INVENTION

Accordingly, it is an object of the present invention to enable a high polymer which is inherently difficult of film formation by the Langmuir-Blodgett process to be formed into a film by this process by modifying the high polymer, and to provide a high polymer thin film which has a thickness conventionally difficult to obtain and which has improved heat resistance, chemical resistance and mechanical properties such as adhesive strength etc.

To achieve the object, a process for forming a film according to the present invention comprises the steps of modifying a high polymer so as to enable film formation by the Langmuir-Blodgett process by introducing a substituent group for imparting a hydrophobic property to a recurring unit of the high polymer, and mixing the thus-modified high polymer with a known Langumuir-Blodgett film compound for film formation by the Langmuir-Blodgett process.

According to the present invention, there is to provide a process for forming a film comprising the step of forming a built-up film of a mixture of a high polymer and a known Langmuir-Blodgett film compound by the Langmuir-Blodgett process, said high polymer including linear recurring units each of which is composed of an at least divalent first organic group $R_1$ having at least two carbon atoms and an at least divalent second organic group $R_2$ having at least two carbon atoms, said first organic group $R_1$ and said second organic group $R_2$ being connected with each other by a divalent bonding group, and at least one hydrocarbon-containing group $R_3$ which have 10 to 30 carbon atoms and optionally contain a substituent group, and which is covalently bonded to the same recurring units.

DESCRIPTION OF THE PREFERRED EMBODIMENTS

Figure 1:
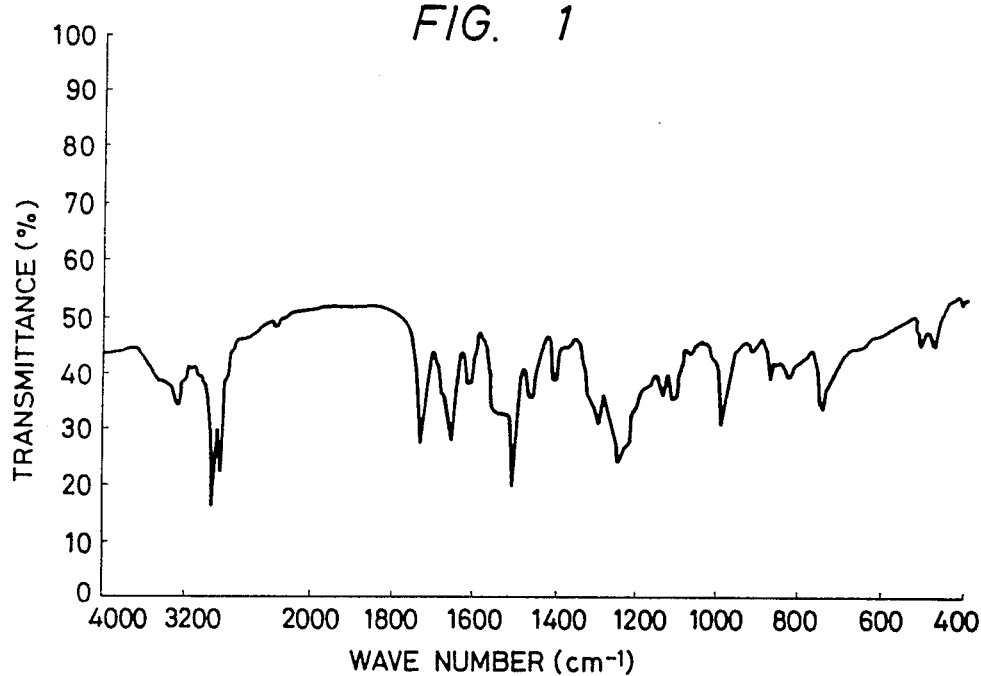
FIG. 1 shows the infrared absorption spectrum of a high polymer obtained in Example 1.

A material of an LB film used in the present invention is a high polymer which includes linear recurring units composed of an at least divalent first organic group $R_1$ having at least two carbon atoms, and at least divalent second organic group $R_2$ having at least two carbon atoms, $R_1$ and $R_2$ being connected with each other through a divalent bonding group; and at least one hydrocarbon-containing group $R_3$ having 10 to 30 carbon stoms which may contain substituent groups and which is covalently bonded to the same recurring units.

To be more specific, the high polymer of this invention comprises as a basic skeleton of a linear recurring unit represented by one of the following formulae.

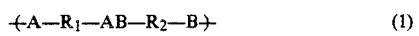  (1)

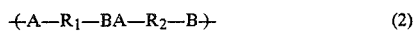  (2)

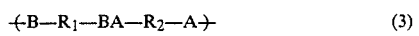  (3)

wherein $R_1$ represents an organic group having a valency of at least two and containing at least two carbon atoms, and $R_2$ represents an organic group having a valency of at least two and containing at least two carbon atoms, at least one of the groups $R_1$ and $R_2$ being preferably a group comprising a benzenoid structure containing at laest 6 carbon atoms.

In the above formulae (1) to (3), AB and BA represent a divalent connecting group formed by a reaction between acidic group A and basic group B wherein both groups contain hetero atoms such as O, N, S, P and B. As examples of such groups, mention may be made of the followings:

A: —COOR (R represents alkyl group or hydrogen atom), —COX (X represents C or Br), —NCO, —NCS, —CN, —CONHR, —SO₂NHR, etc.

B: —NHR, —OR, —SR, —X, etc.

AB:  —CNH—, —CO—, —CS—, —NHCO—, —NHCS—,
         ‖         ‖       ‖         ‖            ‖
         O        O      O        O           O

—NHCO—, —NHCS—, etc.
         ‖              ‖
         S              S

BA:  —NHC—, —OC—, —SC—, —OCNH—, —SCNH—,
         ‖         ‖       ‖         ‖             ‖
         O        O      O        O            O

—OCNH—, —SCNH—, etc.
         ‖              ‖
         S              S

The high polymer of this invention is modified by introducing into any basic skeleton of the recurring units (1) to (3) at least one, preferably two, covalently bonded hydrocarbon-containing groups $R_3$ containing 10 to 30, preferably 14 to 22 carbon atoms, in order to make it possible to form a thin film in accordance with Langmuir-Blodgett technique.

Such a modification can be effected by:

[I] Substituting one or more atoms contained in AB and/or BA groups of said linear recurring unit (1), (2) or (3) by one or more $R_3$ groups;

[II] Directly substituting $R_1$ and/or $R_2$ groups by one or more $R_3$ groups; or

[III] Introducing one or more $R_3$ groups into $R_1$ and/or $R_2$ though the substituent which is not involved in the formation of the linear recurring structure.

It is a matter of course that the above modification methods [I], [II], and [III] can be applied in combination. In the case where more than one $R_3$ groups are introduced into one recurring unit, the $R_3$ groups can be either the same or different.

The modification methods will be further explained hereinbelow.

As specific examples of [I], mention may be made of the followings:

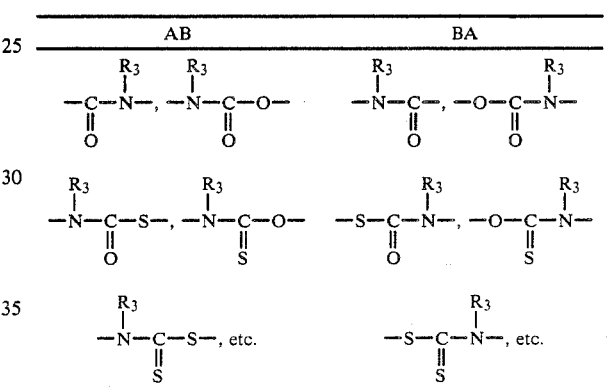

In the modification method [I] shown above, hydrogen atom attached to the nitrogen atom contained in group AB or BA is substituted by $R_3$ groups.

In the modification method [II], $R_3$ is directly introduced into $R_1$ and/or $R_2$ to form, for example, recurring units shown below.

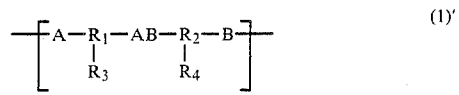  (1)′

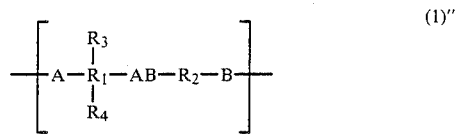  (1)″

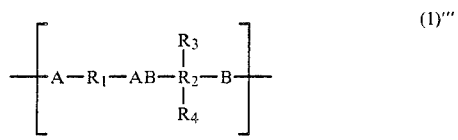  (1)‴

The above-described modification method [III] comprises much more possibilities. To be more specific, in the case of [III], at least one of the groups $R_1$ and $R_2$ must be an organic group having a valency of at least three, and one or more substitutional groups $R_3$ are introduced into group $R_1$ or $R_2$ through the substituent which is not involved for the formation of the recurring structure. As examples of combinations of $R_1$ and $R_2$ where $R_1$ has a valency equal to, or greater than, that of $R_2$, and both of them have a valency not greater than 6, mention may be made of the followings:

|  | Valence of $R_1$ | Valance of $R_2$ |
|---|---|---|
| 1 | 3 | 2 |
| 2 | 4 | 2 |
| 3 | 5 | 2 |
| 4 | 6 | 2 |
| 5 | 3 | 3 |
| 6 | 4 | 3 |
| 7 | 5 | 3 |
| 8 | 6 | 3 |
| 9 | 4 | 4 |
| 10 | 5 | 4 |
| 11 | 6 | 4 |
| 12 | 5 | 5 |
| 13 | 6 | 5 |
| 14 | 6 | 6 |

Of the above combinations, those comprising $R_1$ and $R_2$ groups having a valency of up to 4 can be particularly preferable, although the valencies of the groups are not limited thereto.

Specific examples of linear recurring units comprising combinations of $R_1$ and $R_2$ groups having the following valencies are shown hereinbelow:

$R_1=3$, $R_2=2$
$R_1=4$, $R_2=2$
$R_1=3$, $R_2=3$
$R_1=4$, $R_2=3$
$R_1=4$, $R_2=4$.

When $R_1=3$ valent and $R_2=2$ valent,

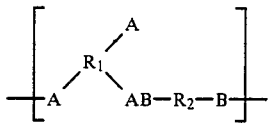 (4)

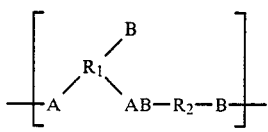 (5)

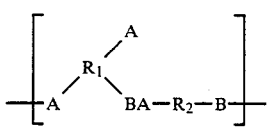 (6)

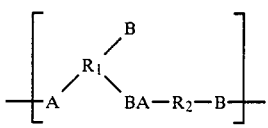 (7)

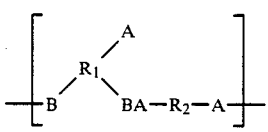 (8)

-continued

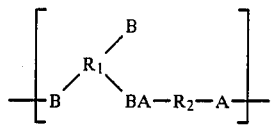 (9)

When $R_1=4$ valent and $R_2=2$ valent,

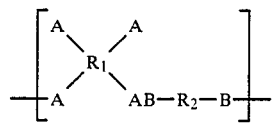 (10)

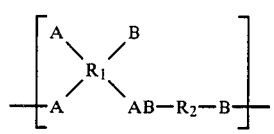 (11)

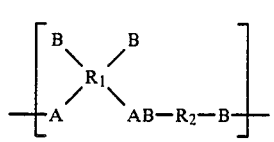 (12)

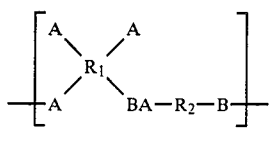 (13)

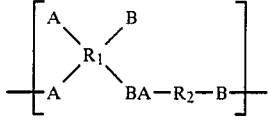 (14)

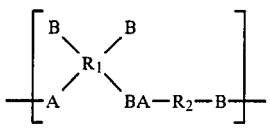 (15)

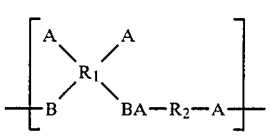 (16)

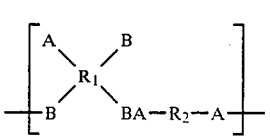 (17)

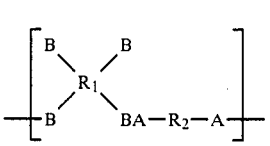 (18)

When $R_1=3$ valent and $R_2=3$ valent,

(19) 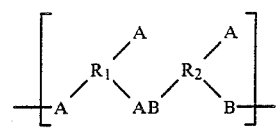
(20) 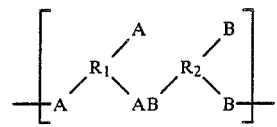
(21) 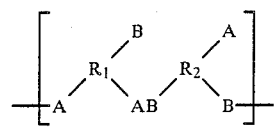
(22) 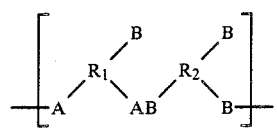
(23) 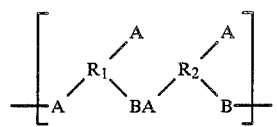
(24) 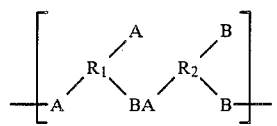
(25) 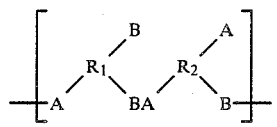
(26) 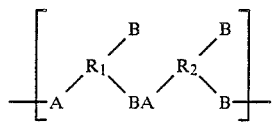
(27) 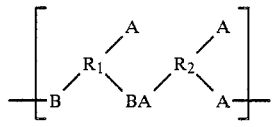
(28) 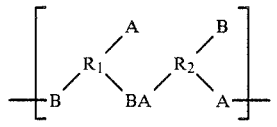
(29) 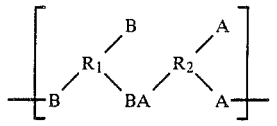
-continued
(30) 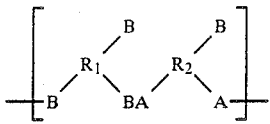
When $R_1 = 4$ valent and $R_2 = 3$ valent,
(31) 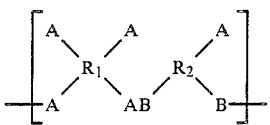
(32) 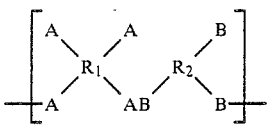
(33) 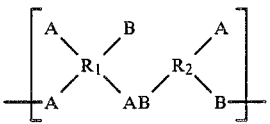
(34) 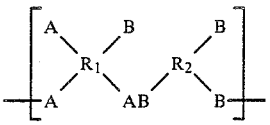
(35) 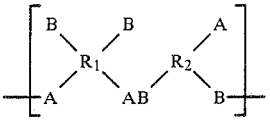
(36) 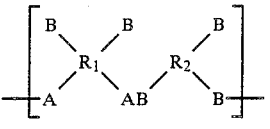
(37) 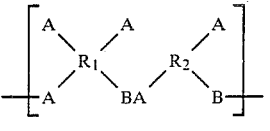
(38) 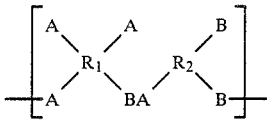
(39) 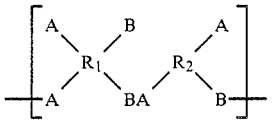
(40) 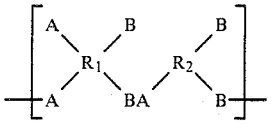

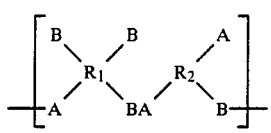 (41)
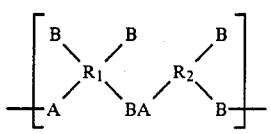 (42)
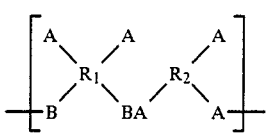 (43)
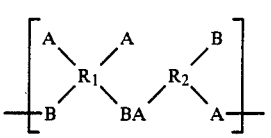 (44)
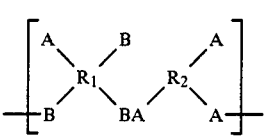 (45)
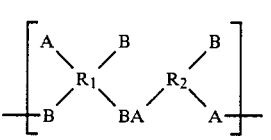 (46)
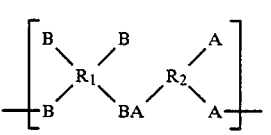 (47)
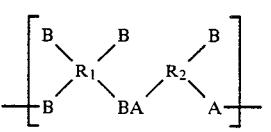 (48)
When $R_1=4$, $R_2=4$,
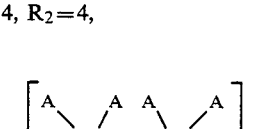 (49)
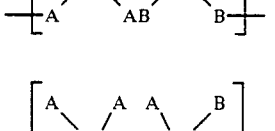 (50)
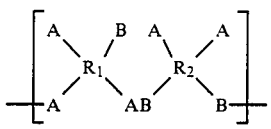 (51)
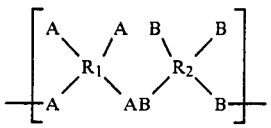 (52)
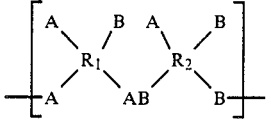 (53)
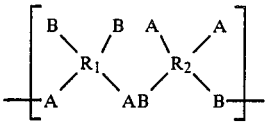 (54)
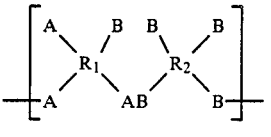 (55)
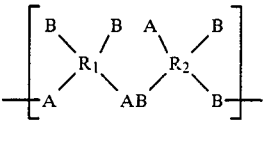 (56)
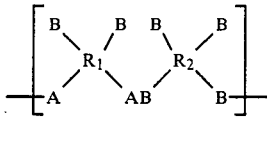 (57)
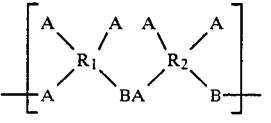 (58)
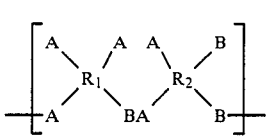 (59)
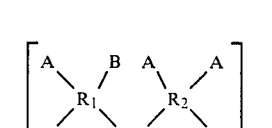 (60)
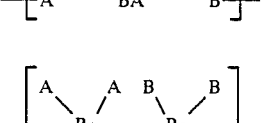 (61)

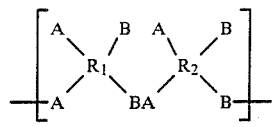 (62)

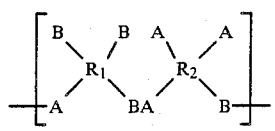 (63)

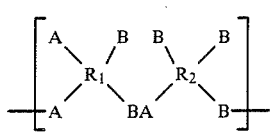 (64)

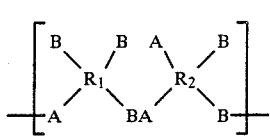 (65)

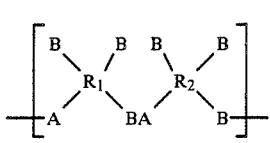 (66)

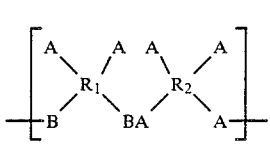 (67)

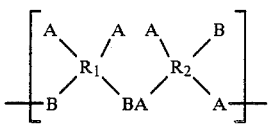 (68)

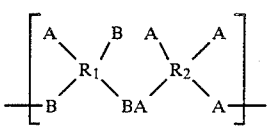 (69)

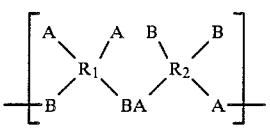 (70)

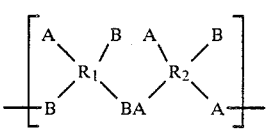 (71)

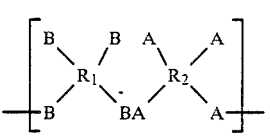 (72)

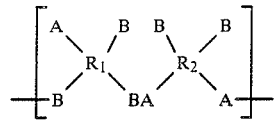 (73)

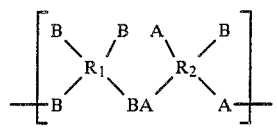 (74)

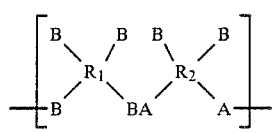 (75)

In the above formulae (4) to (75), there are groups A and B not involved in the formation of the recurring structure. In the modification method [III] mentioned hereinbefore, $R_3$ is introduced into such groups, for example, by substituting atoms or groups contained in A by such groups as —COOR$_3$, —CONHR$_3$, —NHCOOR$_3$ and —NHCSOR$_3$, etc. or by substituting atoms or groups contained in B in such groups as —NHR$_3$, —OR$_3$ and —SR$_3$ etc.

Explanations will be given hereinbelow on $R_1$ and $R_2$. $R_1$ is a group having a valency of at least 2 and containing at least 2, preferably 5 to 20, carbon atoms. It may be an aromatic group; an aliphatic group; an alicyclic group; a group in which an aromatic group is combined with an aliphatic group; a group in which one of the above-mentioned groups is combined with a monovalent group having 1 to 30 carbon atoms selected from the group consisting of an aliphatic group, an alicyclic group, an aromatic group and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups comprising a benzenoid structure having at least 6 carbon atoms can be preferred as $R_1$ or $R_2$, with regard to heat resistance, chemical resistance, physical properties, etc.

The term "benzenoid unsaturation" refers herein to the structure of carbocyclic compounds as contained in ordinary aromatic compounds, as contrasted with quinoid structures.

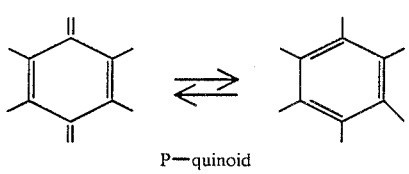

P—quinoid

As the specific examples of $R_1$ and $R_2$, mention may be of the followings:

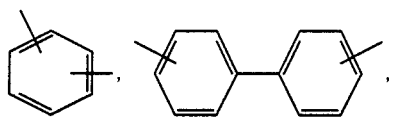 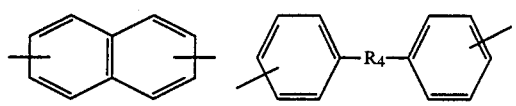
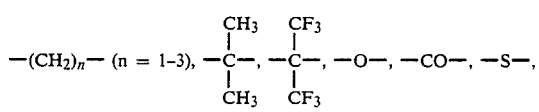 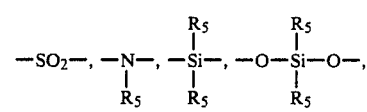
wherein $R_4$ represents
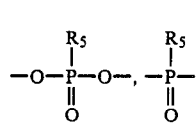
(in which $R_5$ represents an alkyl group or an aryl group).
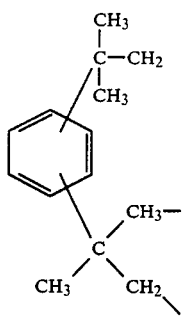
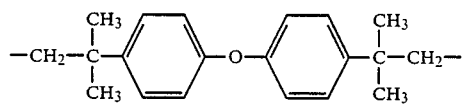
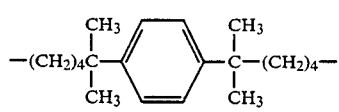
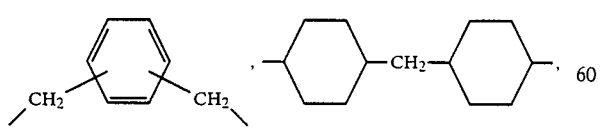
$-(CH_2)_p-$ (p = 2~10), 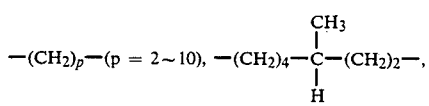
-continued
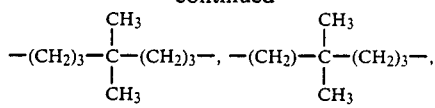
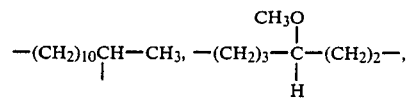
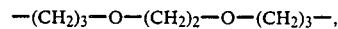
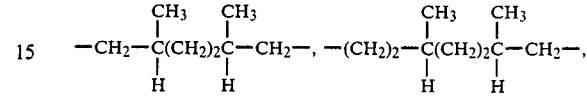
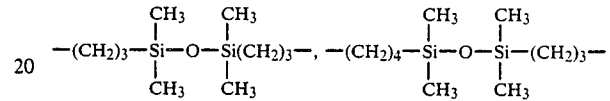
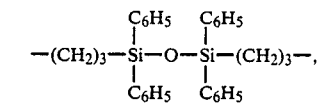
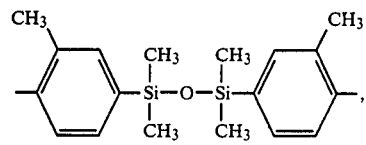
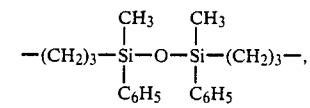
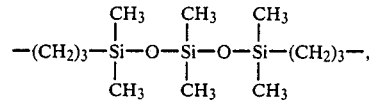
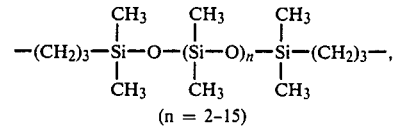
(n = 2-15)
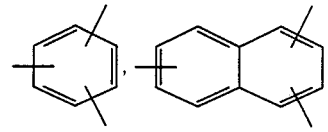
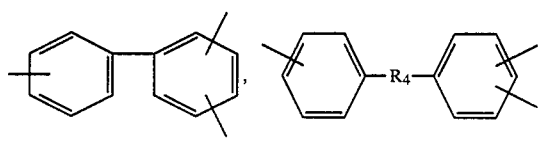
(wherein $R_4$ is as defined before)
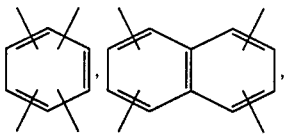

-continued

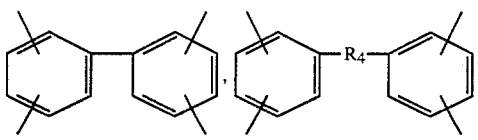

(wherein R₄ is as defined before)

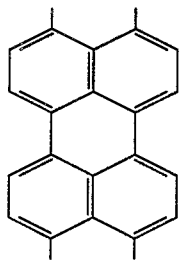

As more preferred examples of R₁ and R₂, mention may be made of the followings:

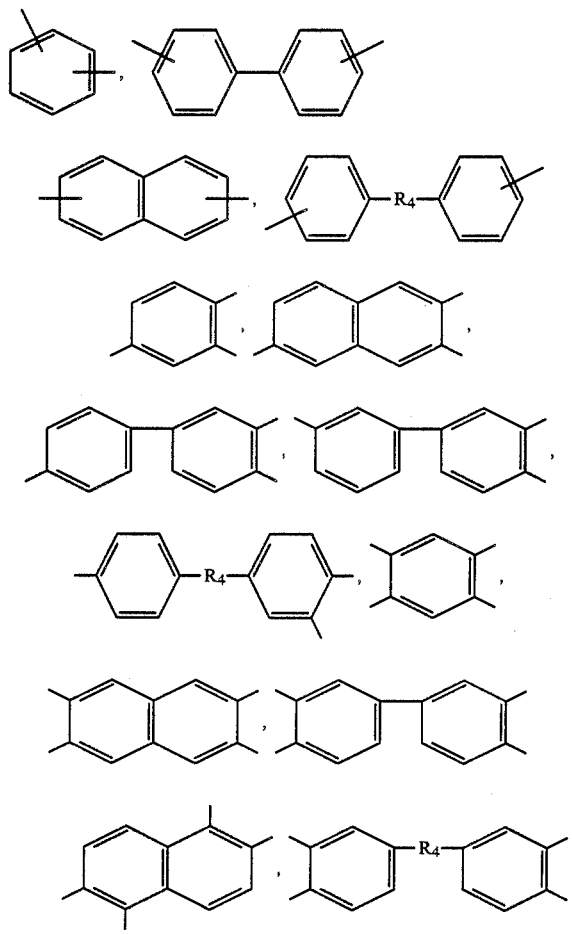

(R₄ is as defined before)

R₃ may be a hydrocarbon containing group having 10 to 30, preferably 14 to 22, carbon atoms.

A preferred example thereof is a monovalent group selected from an aliphatic group, a connecting group of alicyclic group and aliphatic group, a connecting group of aromatic group and aliphatic group, or substituents thereof. As specific examples of R₃, mention may be made of the followings:

$CH_3(CH_2)_{n-1}$, $CH_2=CH(CH_2)_{n-2}$, $(CH_3)_2CH(CH_2)_{n-3}$, $CH_3(CH_2)_l C\equiv C-C\equiv C(CH_2)_m$, $(CH_3)_3C(CH_2)_{n-4}$,

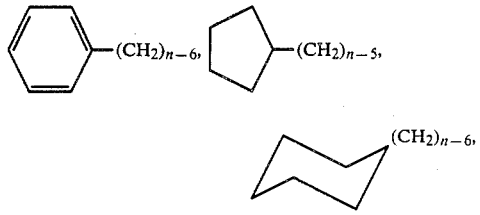

(in which $l+m=n-5$, n is an integer of 10 to 30, preferably 14 to 22).

These groups may be substituted with substitutional groups, such as a halogen atom, nitro group, an amino group, a cyano group, a methoxyl group and an acetoxyl group and the like, however, these are not critical. Fluorine can be preferable as a substituent in some cases since it is capable of imparting stronger hydrophobicity to the polymer than hydrogen.

In other words, alkyl groups having shorter chain can be employed when fluorine atoms are contained therein. For example, in the case of $C_8F_{17}(CH_2)_k-$, $k=2$ will be sufficient to obtain a high polymer capable of forming a film.

Specific examples of high polymers employable in the film forming process of this invention will become apparent by applying the examples of R₁, R₂, R₃, A, B, AB and BA, as well as the modes of substitution of R₃, to formulae (1) to (75). Although no copolymers are included in formulae (1) to (75), it is a matter of course that copolymeric derivatives and mixtures thereof are included within the scope of this invention.

Furthermore, although it is not indispensable, the high polymer of the present invention may be substituted by groups containing 1 to 9 carbon atoms according to the processes of [I], [II] or [III].

There are no particular limitation on the molecular weight of the high polymer of this invention. A film can be formed in accordance with the film-forming process of this invention even when its molecular weight is relatively small. In such a case, however, it may not be possible to attain good heat resistance, mechanical strength and chemical resistance. On the other hand, an excessively high molecular weight is undesirable since it may become difficult to form a film because of increase of viscosity.

Accordingly, a weight average molecular weight of from ca. 2,000 to 300,000 can be preferable, and from 10,000 to 150,000 can be more preferable.

Specific examples which can be advantageous in costs and easiness of synthesizing monomers and polymers, are shown below. However, these are not restrictive.

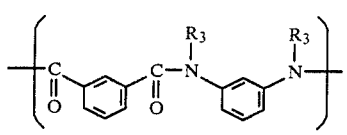

(76)

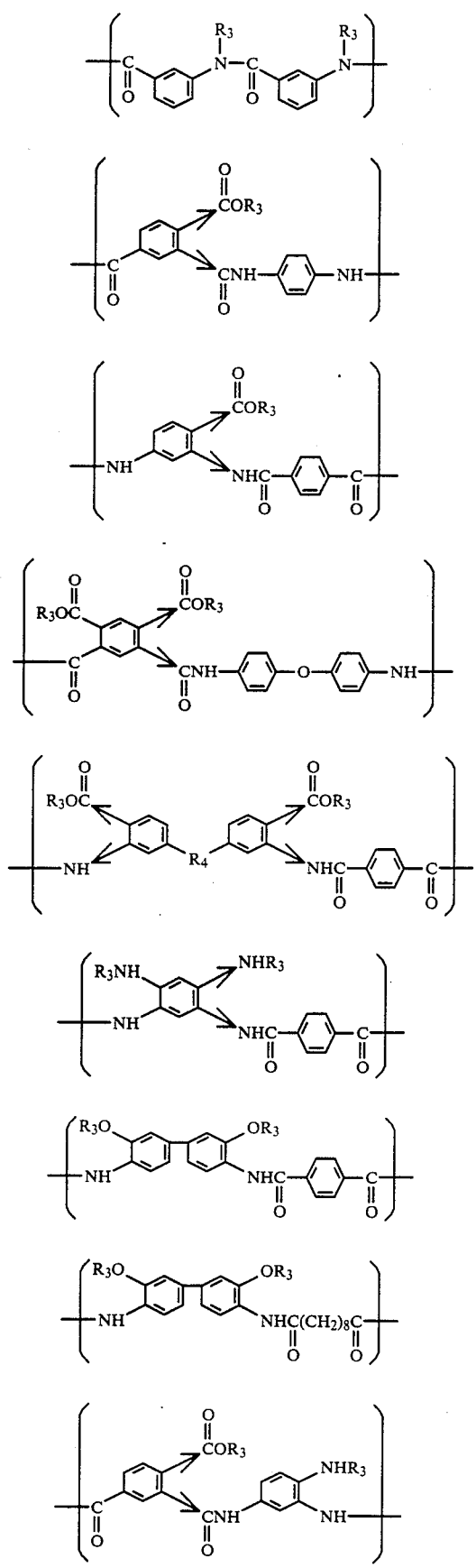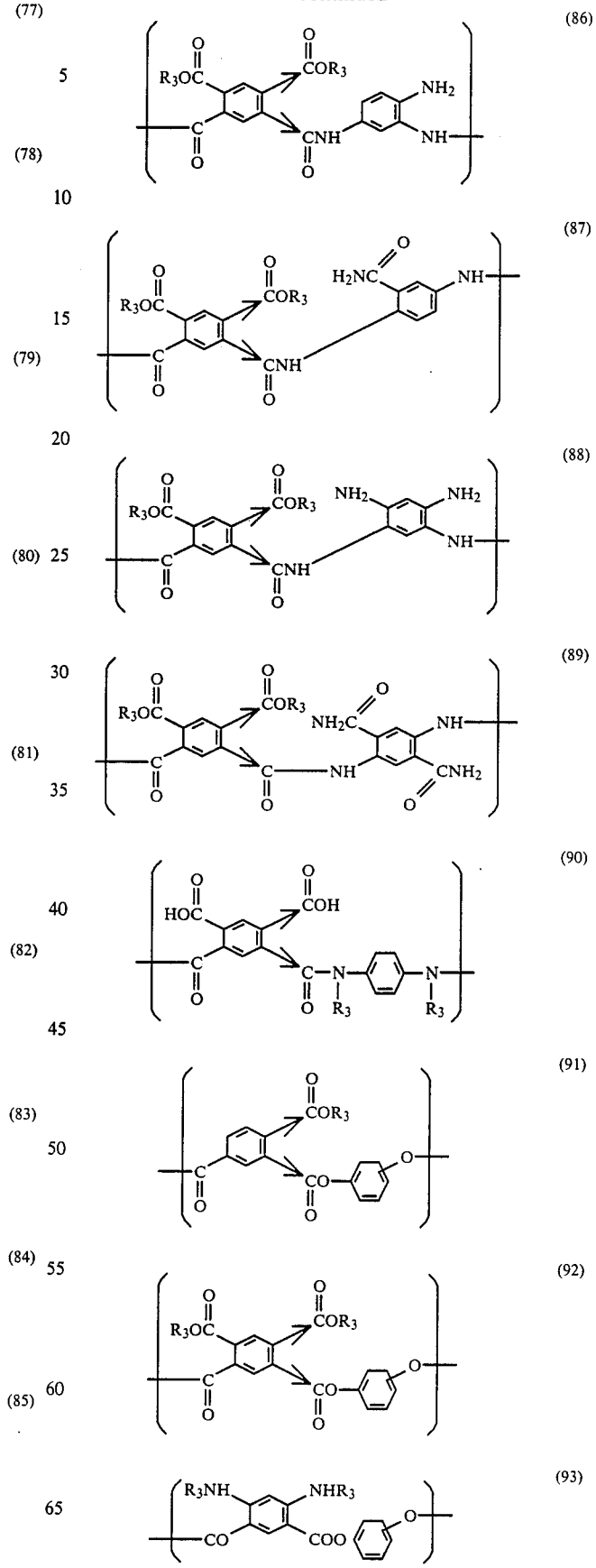

-continued

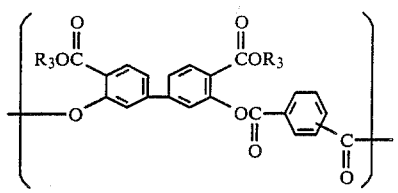
(94)

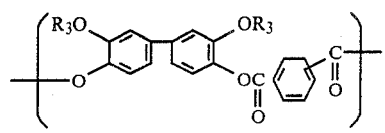
(95)

In the above formulae, "→" indicates isomerism. For instance, formula (78) stands for formulae (78-1) and (78-2) shown below.

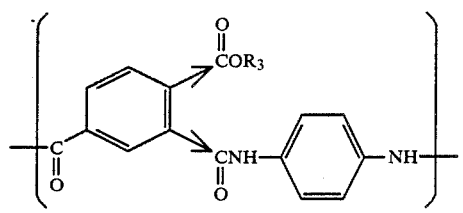
(78)

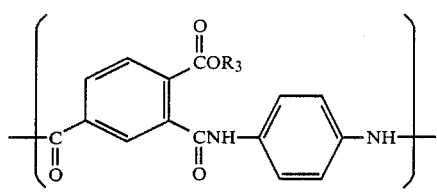
(78-1)

and

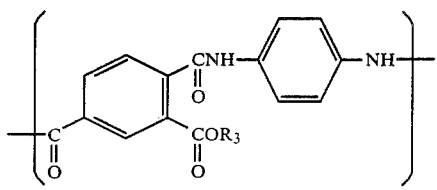
(78-2)

The present invention includes both cases in which each of (78-1) and (78-2) exists singly and in combination.

Other examples may be found in books such as "Heat Resistance of High Polymer" (published by Baifukan, Mar. 5, 1970) and "Thermal Decomposition and Heat Resistance of High Polymer" (published by Baifukan, Mar. 5, 1974) edited by Hirotaro Kambe.

The process for producing thin films of the modified amphiphilic high polymer will be explained hereinbelow, referring to the case where $R_3 = CH_3(CH_2)_{17}-$ in formula (80). The following compound:

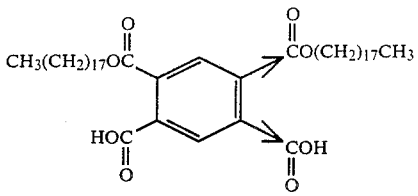

which is obtained by the alcoholysis of pyromellitic acid dianhydride is acylated with thionyl chloride at a temperature of not lower than $-10°$ C., a temperature up to near the boiling point of the acid halide being preferable about $0°-40°$ C. in an organic polar solvent under a substantially anhydrous condition, followed by reacting the resulting product with diaminodiphenyl ether at a temperature of not lower than $-10°$ C., preferably $-10°$ C. to $+20°$ C., more preferably from $0°$ to $+10°$ C. However, in the latter stage of the reaction, the use of reaction temperature over $20°$ C. is favorable to complete the reaction. The acylation and the amidation are usually carried out at a temperature between about $0°$ C. to $-10°$ C., but as the substituent groups such as long chain alkyl groups, etc. have the tendency of freeze solidifying in this invention, they should preferably be carried out at a temperature of not lower than $-10°$ C. In the above case, of course, either raw materials having different substituent groups may also be mixed to give copolymers, or tetracarboxylic acid dianhydride or diamine having no substituent group or having substituent groups not more than 10 carbon atoms may be mixed in an amount of about 0 to 50%.

The thus prepared amphiphilic polyimide precursor can be used as a material for forming a film after having been isolated and purified, or can be added with a solvent, such as chloroform and benzene, so as to directly make a spreading solution for forming a polymeric film.

Explanations will be given hereinbelow on the process for forming Langmuir-Blodgett films to be used in this invention.

In a process for forming a Langmuir-Blodgett film, a film-forming material is spread on the surface of water, and the thus spread material is compressed at a certain surface pressure to form a monomolecular film, which is then transferred or laminated onto a substrate by passing the substrate through the film. This is known as the vertical dipping method. Other known processes for forming a Langmuir-Blodgett film include the horizontal dipping method, the revolving cylindrical method, etc. (See "Shin Jikken Kagaku Koza", Vol. 18, (Surface and Colloids), pp. 498–508. Any conventional processes can be applied to this invention without any particular restrictions.

The Langmuir-Blodgett process is an excellent method for forming oriented thin film of not less than 1000 Å, or of several hundreds Å or several tens Å. The thickness of the thin films can be controlled with an accuracy of some tens Å and the films formed on a substrate in accordance with this invention also have the same characteristic. However, it is possible in this invention to form a film having a thickness greater than 10,000 Å.

It was found that the film of the modified high polymer of the present invention can be singly formed by the inventors of the present invention (Japanese Patent Application No. 202191/1985). Thereafter, it has also been found that the film-forming property can be improved by mixing such a high polymer with a known compound capable of forming Langmuir-Blodgett film and thus, the present invention has been achieved.

"The known Langmuir-Blodgett film compound" disclosed herein is a compound known to those skilled in the art which is described in the above-described literatures. A compound consisting of a hydrocarbon group which has about 14 to 22 carbon atoms and a hydrophilic group and represented by one of the following formulae is preferable:

$CH_3(CH_2)_{n-1}Z$ $CH_2=CH(CH_2)_{n-2}Z$ $CH_3(CH_2)_lC\equiv C-C\equiv C(CH_2)_mZ$ wherein n is an integer of from 14 to 22, $l+m=n-5$, and $Z=OH$, $NH_2$, COOH or COOR' (R' represents a lower aliphatic hydrocarbon group).

A compound represented by the formula $CH_3(C_2)_{n-1}Z$ is preferable in terms of cost, while among the formulae, in order to improve the film-forming property, a compound containing unsaturated bond is preferable since it can be polymerized by irradiation by light, radiation or the like.

The mixture ratio of at least one selected from the above compounds and a hihg polymer is not limited.

Upon the formation of films according to the Langmuir-Blodgett process, there is used, in general, a solvent, such as benzene chloroform and the like, which is insoluble to water and vaporizable into the gaseous phase. However, in the case of the high polymer of this invention, it is preferred to use a polar organic solvent in combination with a volatile solvent, in order to attain an increased solubility. As examples of preferable polar organic solvents, mention may be made of N,N-dimethylformamide, N,N-dimethylacetamide, N,N-diethylform-amide, N,N-diethylacetamide, N,N-dimethylmethoxy-acetamide, dimethylsulfoxide, N-methyl-2-pyrrolidone, pyridine, dimethylsulfone, hexamethylphosphoramide, tetramethylenesulfone, dimethyltetramethylenesulfone and the like.

In the case where an organic polar solvent is used in combination with a volatile solvent, such as benzene and chloroform, the latter, it is presumed, vaporizes into the gaseous phase during the spreading, whereas the former dissolves into the large quantity of water.

There is not particular limitation on the kind of substrate to be used in this invention. It depends only on the use or application of the film. Examples of substrates usable in this invention include those made of ordinary inorganic substrances, such as glass, alumina and quarts; those made of metals, plastics, and semiconductors of, e.g., Groups IV, III-V and II-VI of the Periodic Table, such as Si, GaAs and ZnS; and those made of magnetic materials or ferroelectric materials, such as $PbTiO_3$, $BaTiO_3$, $LiNbO_3$, and $LiTaO_3$. It is also possible to use a substrate subjected to a conventional surface treatment. The adhesion between the high polymer film of this invention and a substrate can also be improved by applying a silicone coupling agent (in particular, a silicone coupling agent containing amino and epoxy groups) or an aluminium chelate to a substrate and then subjecting it to a heat treatment. The substrate may be treated in a plurality of layers with metal salts of fatty acids as conventionally applied in this field.

It is a characteristic feature of this invention that a thin film of a high polymer having a good heat resistance can be formed on a substrate in accordance with the Langmuir-Blodgett process. It is another feature of this invention that some of the films can be subjected to a partial or complete ring-closing treatment, in order to further improve the heat resistance of the thin film formed on the substrate.

Among the polymers (76) to (95), the polymers (78) to (90) can be produced through partially or completely ring closure of a five-membered or six-membered ring containing a hetero-atom. The structures of the polymers (78) to (90) after the complete ring closure will be as shown below.

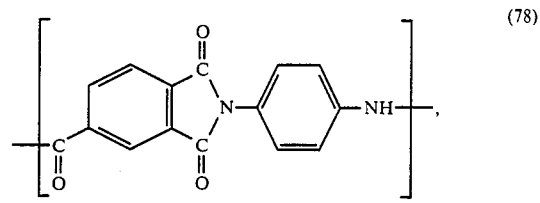
(78)

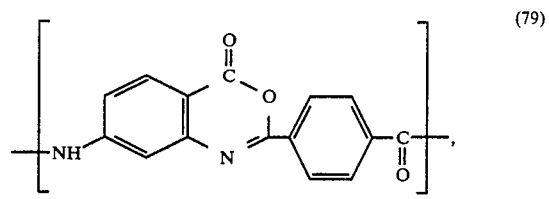
(79)

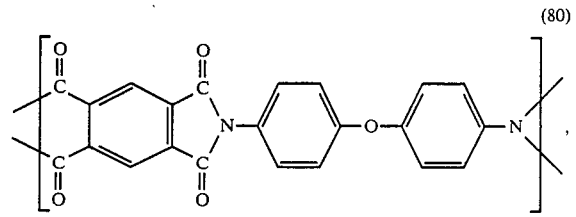
(80)

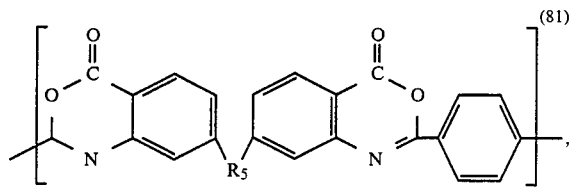
(81)

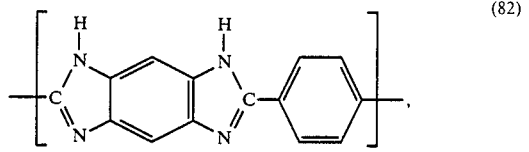
(82)

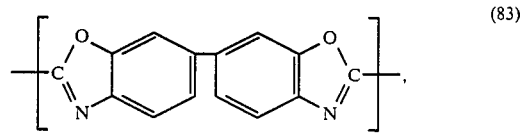
(83)

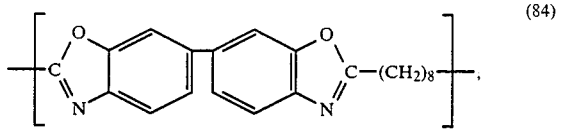
(84)

(85) 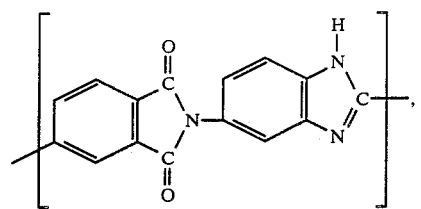

(86) 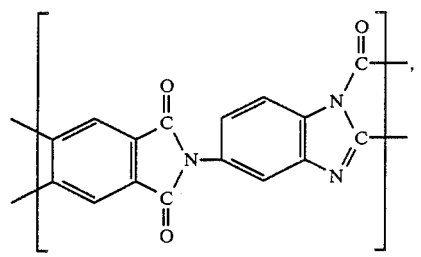

(87) 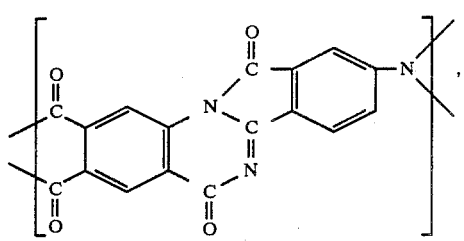

(88) 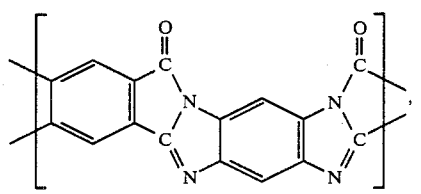

(89) 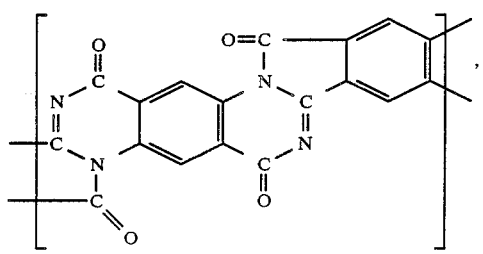

(90) 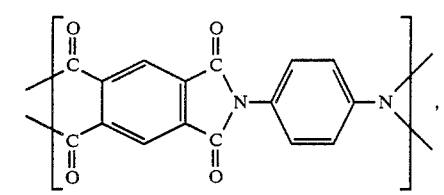

There are no particular limitations on the treatment to be employed for the ring closure. In the case of imidation of a sample represented by (80), the following reaction takes place when heated at a temperature of around 200° to 400° C.

High polymer of (80)

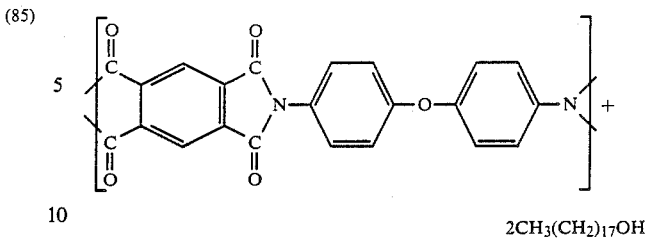

$2CH_3(CH_2)_{17}OH$

At this time, the group which has been introduced for the purpose of increasing the hydrophobic nature is eliminated as an alcohol, but since the eliminated alcohol can be removed at a temperature of about 200° to 400° C., if necessary, under a gas flow or a vacuum, a polyimide thin film having a very high heat resistance can be obtained.

In order to obtain a thin film having a high heat resistance by such a ring closure process, it is preferable to select a known Langmuir-Blodgett film compound from the above-described examples which is able to be removed under the condition of a ring closure reaction.

The use applications of such a thin film will now be described.

A thin film of the present invention is characterized in that it is a very thin film having efficient heat resistance, chemical resistance and mechanical properties. Owing to such characteristics, it is applicable to various fields such as electronics, energy conversion and material separation.

In the field of electronics, in which the electric conductivity, photo-conductivity, optical characteristics, insulation characteristics, thermal characteristics and chemical reactivity of a thin film of the present invention are utilized, the film may be used as an optical recording film, resist film, insulating film, thin film for a capacitor, liquid crystal orientation film, polarizing film, sensor film, etc. As an insulating film, it can be used as an insulation layer in the electrical and electronic elements having the structure of MIS, MIM, etc. in which various kinds of semiconductors or metals have been intended therewith as an insulation layer of an IC or an LSI, and a field-effect transistor device, photoelectric device, light emitting device, light receiving device, light detecting device, hot electron transistor, etc. Especially, a thin film of the present invention is effective for MIS and MIM devices which utilize a tunnelling effect, and is also usable as the insulating film of a JJ (Josephson Junction).

Furthermore, the film may be applied to a cladding material or an optical circuit element for a waveguide.

The film may also be suitable as a protective coating material in various fields. The use of a mixed material of the present invention in place of a fatty acid in the technique of forming a mixed film or a laminated film of a functional LB material and a fatty acid, which technique is generally adopted in the field of an LB film, brings about various functions, and such a mixed film and a laminated film are considered to have many uses. For instance, it is possible to produce a photoelectric device and a biosensor by preparing a film containing a dye and an enzyme, respectively.

In addition, the use of such a film in the field of material separation will also be possible.

The process for preparing a high polymer of the present invention and the process for forming a film according to the present invention will be explained in the following with reference to Examples.

EXAMPLE 1

10.91 g of pyromellitic acid dianhydride and 27.05 g of stearyl alcohol were reacted at 120° C. for 3 hours, and the reaction product was recrystallized from 200 m of ethanol to obtain distearyl pyromellitate having a melting point of 133° to 137° C.

3.79 g of distearyl pyromellitate was dissolved in 60 cc of hexamethylene phosphoramide and cooled to 5° C. 1.19 g of thionyl chloride was added dropwise thereto at about 5° C. After dropping, the reaction was continued for about one hour. Thereafter, 1.2 g of diaminodiphenyl ether dissolved in 30 cc of diaminoacetacido was added dropwise to the reaction mixture at about 10° C., and the reaction temperature was raised to about 20° C. to react the mixture for 2 hours. The reaction mixture was poured into 400 cc of ethanol to separate the reaction product. The separated product was filtered and dried at 40° C. to obtain about 3.4 g of pale yellow powder.

IR spectrum analysis, thermal analysis (TGA-DTA) and measurement of molecular weight by GPC were carried out. The results are as follows:

IR Spectrum Analysis

The IR chart taken by the KBr disc process is as shown in FIG. 1, in which the characteristic absorptions of ester, amides I, II and III, alkyl chain and ether are seen.

Thermal Analysis (TGA-DTA)

Figure 2:
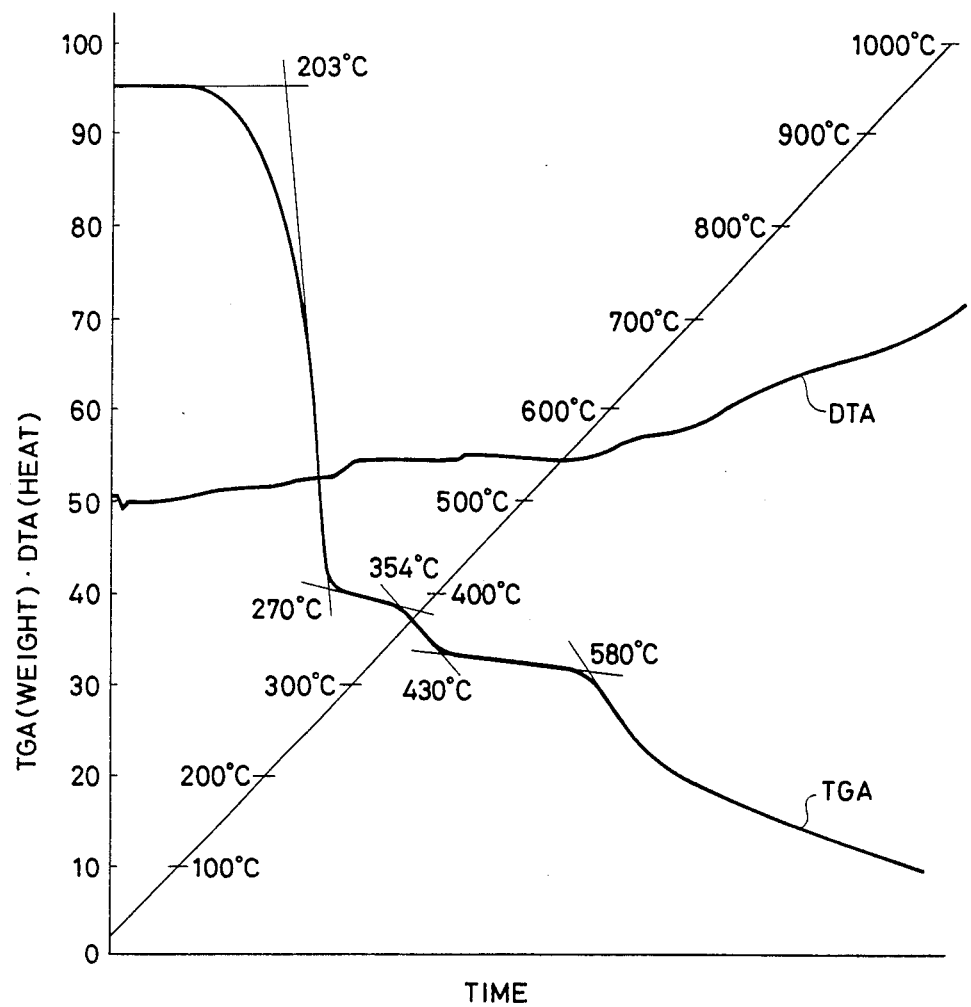
FIG. 2 shows the result of the thermal analysis of the high polymer shown in FIG. 1.

Thermal analysis was carried out in a nitrogen flow (30 m/min) by using an (H) type of RTG-DTA analyzer manufactured by Rigaku Denki with a full scale of 10 mg (H) for TGA and 100 V for DTA under the condition that the temperature was raised up to 1,000° C. at a rate of 10° C./min. The result is as shown in FIG. 2. In the TGA inflection points are seen at 203°, 270°, 354°, 403° and 580° C., while in the DTA no characteristics peak appears.

Measurement of Molecular Weight by GPC

The number-average molecular weight which was measured in a mixed solvent of chloroform and N,N-dimethylacetamide (8:2) was about 15,000 calculated in terms of polystyrene.

EXAMPLE 2

25 ml of spreading solution for an LB film was prepared by dissolving 55.1 mg of the product of Example 1 in a mixed liquid of distilled chloroform/dimethylacetamide=8:2 in volume ratio.

Figure 3:
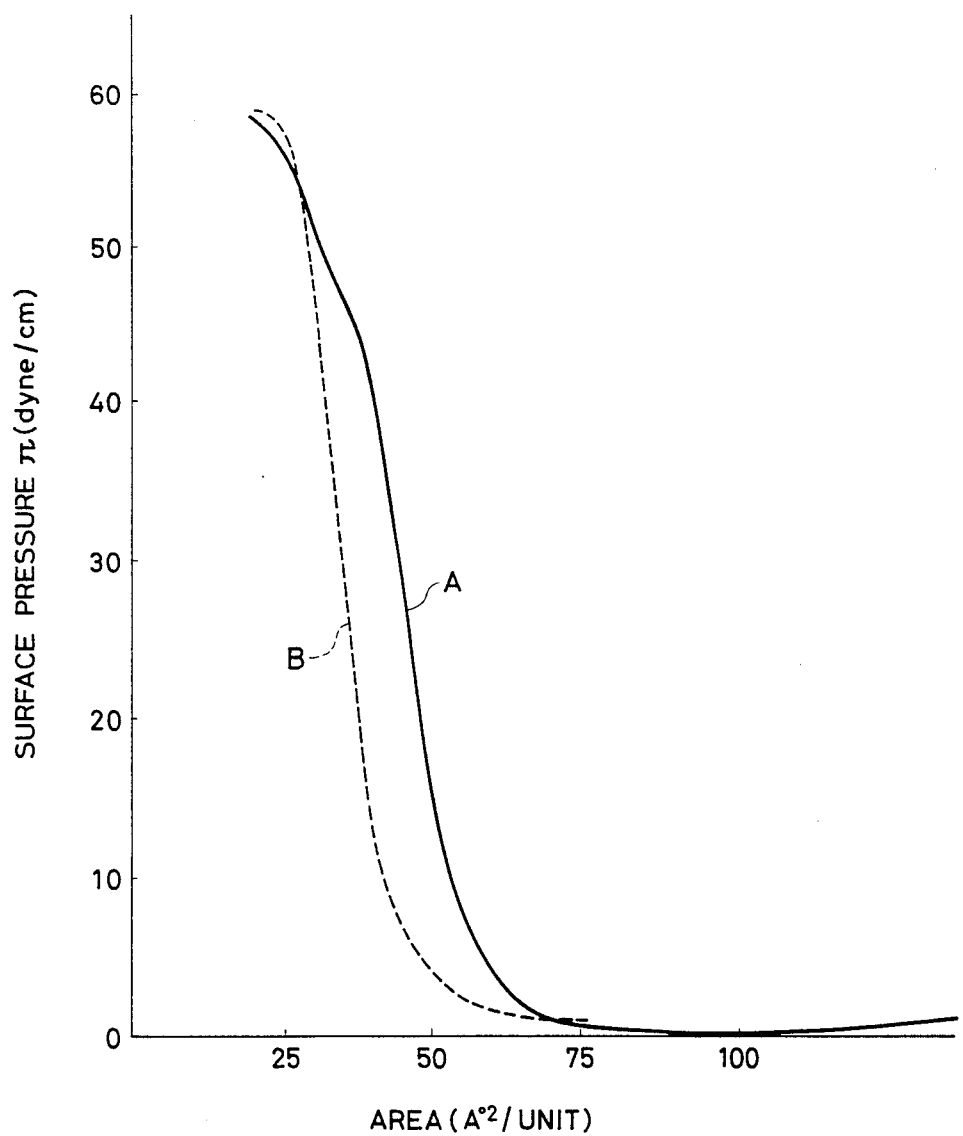
FIG. 3 shows the surface pressure vs. area curves obtained when the high polymer of Example 1 is mixed with stearyl alcohol in the molar ratio of 1:1.

The relationship between the surface pressure and the area per repeating unit was measured on the surface of redistilled water at 20° C. The result is as shown in FIG. 3. The surface pressure rose rapidly at around 65 Å$^2$/unit, and a good condensed film was formed. The limiting areas was about 55 Å$^2$/unit and the collapsing pressure was about 45 dyne/cm (FIG. 3-A).

To the spreading solution the same volume of stearyl alcohol having the same molar concentration as that of the solution was mixed so that the sum of the number of the recurring units of the product of Example 1 and the number of the molecules of the stearyl alcohol may become equal to the number of the recurring units of FIG. 3-A. The relationship between the surface pressure and the area indicated by B in FIG. 3 is obtained. It is clear that the addition of stearyl alcohol makes the rise of the curve steeper and also rises the collapsing pressure to 60 dyne/cm, in other words, makes the film more stable.

A built-up film on a glass substrate with aluminum deposited thereon was a good Y-type film whether stearyl alcohol had been added or not.

When a mixture of the product of Example 1 and stearyl alcohol in a molar ratio of 1:1 was built up on a germanium substrate and was heated for one hour at 400° C. in a nitrogen gas flow, the disappearance of the stearyl group and the appearance of a five-membered imide ring at 1790 and 1710 cm$^{-1}$ was observed by an FT-ATR-IR spectrum analysis.

EXAMPLE 3

The pressure surface vs. area curves were evaluated in the same way as in Example 2 by using stearic acid, ω-heptadecenic acid, and octadecane in place of stearyl alcohol, respectively. It was found that the rise of the curve was steep and the collapsing pressure rose in any case.

The collapsing pressures in the case of using stearic acid and ω-heptadecenic acid were approximately the same and higher than that in the case of using octadecan.

The films formed by adding stearic acid, ω-heptadecenic acid and octadecane, respectively, were built up in the form of a Y-type on a glass substrate with aluminum deposited thereon, whereby good built-up films were obtained.

EXAMPLE 4

2.47 g of distearyl pyromellitate synthesized in the same way as in Example 1 was cooled to 0° to 5° C. in 12 cc of dried hexamethyl phosphoramide and acylated by introducing 0.744 g of thionyl chloride. The acylated product was added to a water solution of 0.358 g of resorcinol and 0.26 g of caustic soda prepared in advance while drying it at room temperature. The produced precipitate was separated and refined by reprecipitation, whereby 0.92 g of white powder was obtained. The following results were obtained by IR spectrum analysis, thermal analysis (TGA-DTA) and measurement of molecular weight by GPC.

IR Spectrum Analysis

Figure 4:
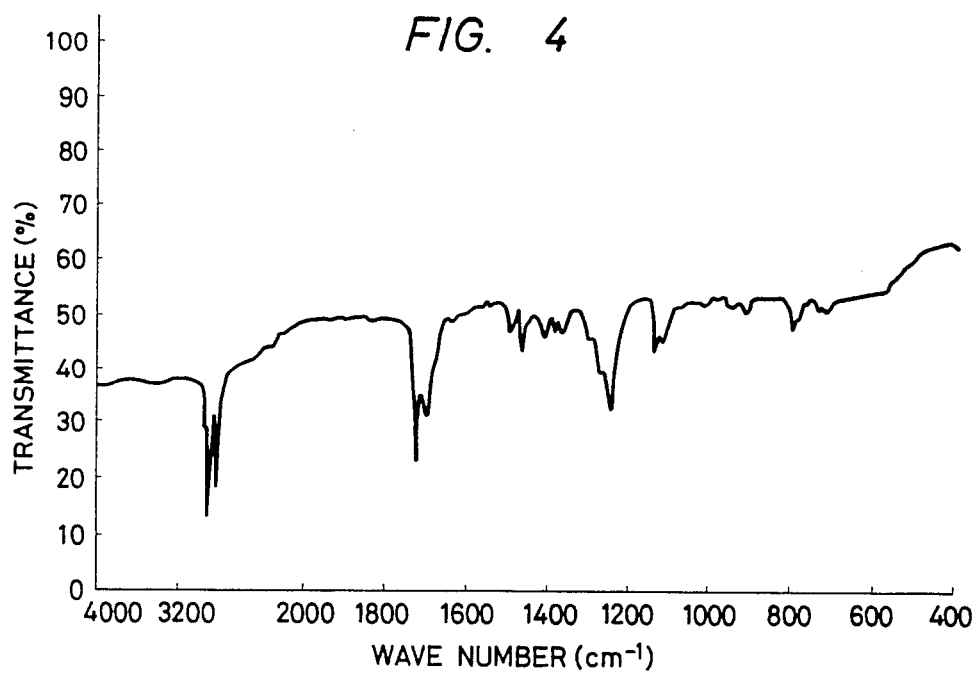
FIG. 4 shows the infrared absorption spectrum of a high polymer obtained in Example 4.

The IR chart taken in the same way as in Example 1 is as shown in FIG. 4, in which the characteristic absorptions of ester and alkyl chain are seen.

Thermal Analysis (TGA-DTA)

Figure 5:
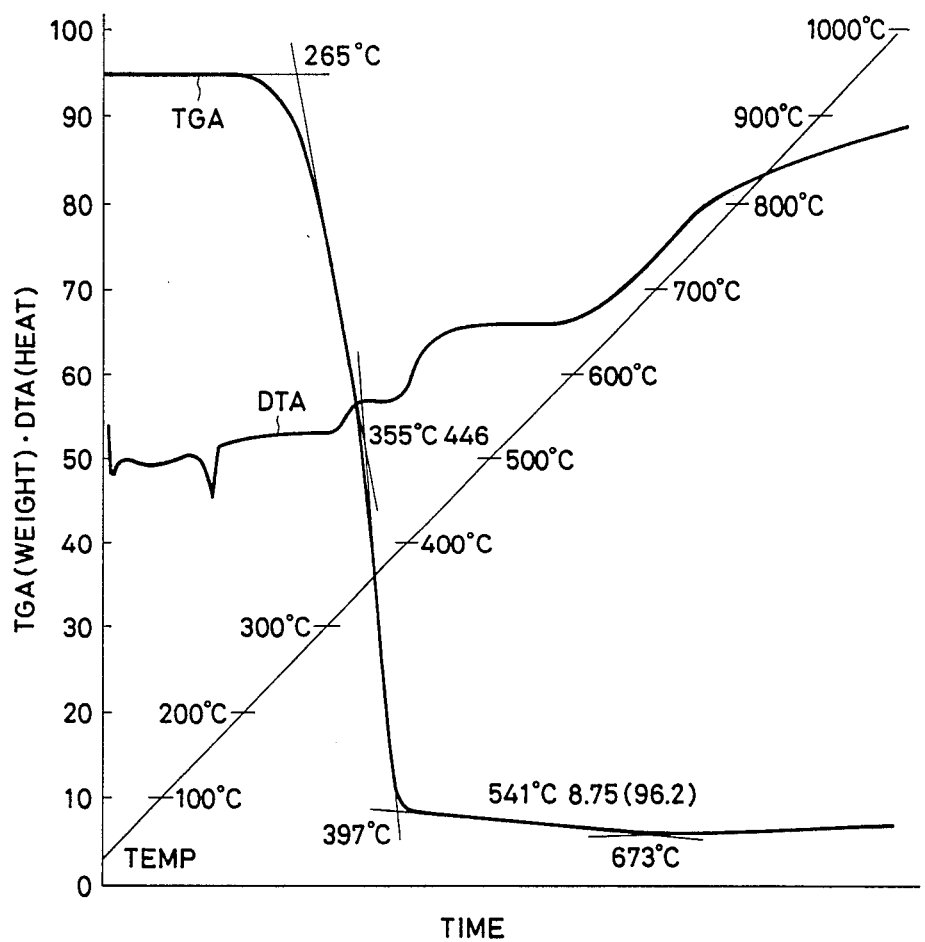
FIG. 5 shows the result of the thermal analysis of the high polymer shown in FIG. 4.

The result of the thermal analysis carried out in the same way as in Example 1 is shown in FIG. 5. In the TGA inflection points appear at 265°, 355°, and 397° C., and rapid thermal decomposition starts at 265° C. while the product is considered to be thermally stable below about 200° C. In the DTA, on the other hand, a sharp absorption peak and an exothermic peak which is considered due to broad thermal decomposition were observed at 160° C.

Measurement of Molecular Weight by GPC

The number average molecular weight which was measured in the same way as in Example 1 was about 7,000 calculated in terms of polystyrene.

EXAMPLE 5

10 ml of spreading solution for an LB film was prepared by dissolving 17.3 mg of product of Example 4 in a mixed liquid of distilled chloroform/dimethylacetamide=19:1 in volume ratio.

Figure 6:
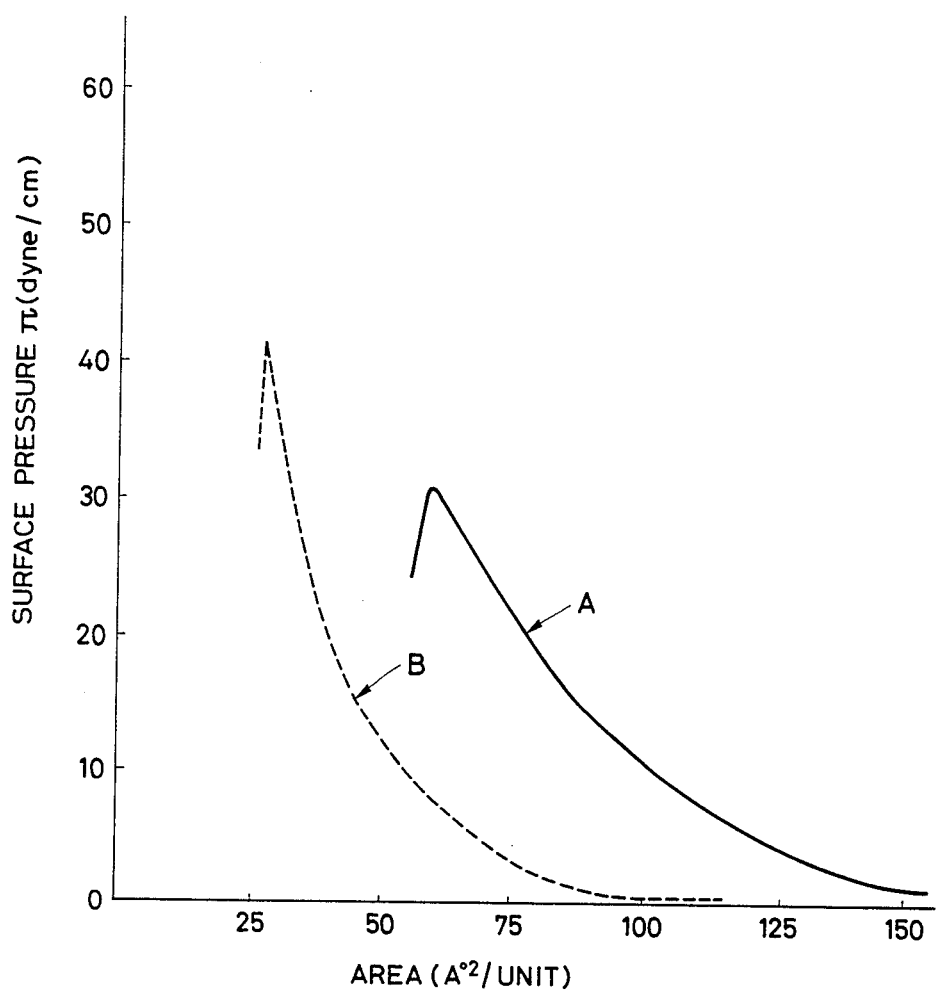
FIG. 6 shows the surface pressure vs. area curves obtained when the high polymer of Example 4 is mixed with stearyl alcohol in themolar ratio of 1:1.

The relationship between the surface pressure and the area per recurring unit was measured on the surface of redistilled water at 22° C. The curve represents the characteristic of an expanded film, as indicated by A in FIG. 6, and the film collapsed at a surface pressure of 30 dyne/cm. When the film was built up at a surface pressure of 20 dyne/cm and at a built-up speed of 10 mm/min, the film was built up only when a substrate was move upward.

The surface pressure vs. area curve was then measured by mixing the spreading solution with stearyl alcohol in the same way as in Example 2. The rise of the curve was steep as indicated by B in FIG. 6. It was confirmed from the area-time curve that a Y-type film would be obtained on a glass substrate by mixing the solution with stearyl alcohol in a molar ratio of 1:1.

COMPARATIVE EXAMPLE 1

Figure 7:
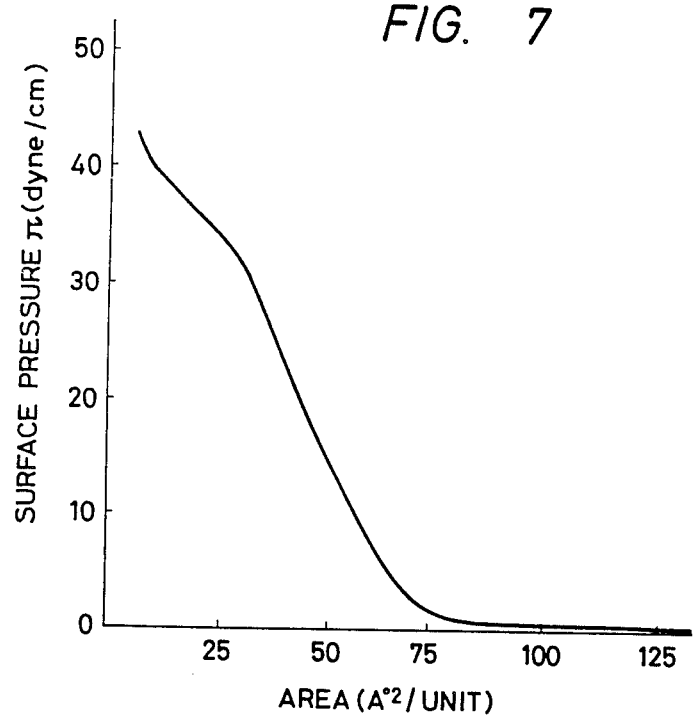
FIG. 7 shows the relationship between surface pressure and area per recurring unit of the precursor obtained in Comparative Example 1.

A polyimide precursor was synthesized in the same manner as in Example 1, except that n-decyl alcohol (n-$C_{10}H_{21}OH$) was used instead of stearyl alcohol. As far as Ir spectrum, thermal analysis and molecular weight measured by GPC are concerned, the polyimide precursor showed the same characteristics as those of the polyimide obtained in Example 1. However, the surface pressure-area curve of the precursor, shown in FIG. 7, indicates the presence of a liquid expansion phase and denies the existence of a condensed phase. It would, therefore, be apparent that an alkyl group containing only 10 carbon atoms would be too short to give a polymer capable of forming a stable condensed film. No good built-up film was obtained even adding prior known Langmuir-Blodgett film compound.

EXAMPLES 6, 7 AND 8

A polyimide precursor was synthesized in the same manner as in Example 1, except that straight chain alcohols, having 14, 16 and 22 carbon atoms respectively, were used instead of stearyl alcohol. As far as IR spectrum, thermal analysis, molecular weight measured by GPC and surface pressure-area curve are concerned, the polyimide precursor showed the almost same characteristics as those of the polyimide obtained in Example 1. The polyimide precursors having 14 and 22 carbon atoms also formed stable condensed film and were capable of forming built-up films according to an LB process. Especially, good built-up film of Y-type was obtained simultaneously using straight chain alcohol.

EXAMPLE 9

Synthesis of an Amphiphilic High Polymer from Trimellitic Acid Monostearyl Ester and 2,5-Diaminobenzamide In a 200 ml four neck flask an acid chloride was prepared from trimellitic acid monostearyl ester (2.31 g, 5.00 millimoles), HMPA (30 ml), and thionyl chloride (1.19 g, 10.0 millimoles). Thereto was dropwise added 2,5-diaminobenzamide (0.756 g, 5.00 millimoles) at about 5° C. with stirring by the use of a mechanical stirrer. Stirring was further continued for more than one hour, and the temperature was slowly restored to room temperature. The resulting red-brown reaction liquid was poured in 500 ml of ethanol, while stirring by the use of a mechanical stirrer, when a white precipitate was formedd. The precipitate was filtered, washed first with water and then with ethanol, and dried under a reduced pressure, whereby polyamide 5 (2.30 g, yield 80%) was obtained as a pale yellow solid. The structure was identified by $^1$H-NMR and IR spectrum.

The results of $^1$H-NMR, IR spectrum analysis, thermal analysis (TGA-DTA), and the measurement of molecular weight by GPC are as follows.

$^1$H-NMR Analysis

The proton NMR spectrum obtained in DMF-$d_7$+$CDCl_3$ was assigned as follows.

$\delta 0.7$–$1.7$ (m, 35H $CO_2CH_2C_{17}H_{35}$)
$\delta 4.25$ (t, 2H $CO_2CH_2C_{17}H_{35}$)
$\delta 7.90$–$8.40$ (m, 6H, aromatic)

The proton of CONH could not be observed.

IR Spectrum Analysis

Figure 8:
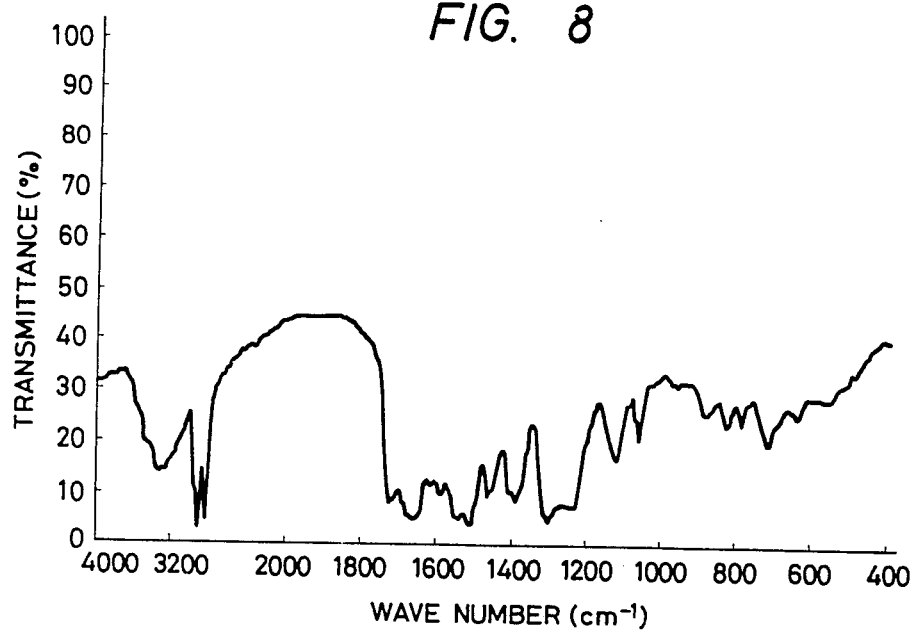
FIG. 8 shows the IR spectrum of the amphiphilic high polymer obtained in Example 9.

As the IR chart obtained by KBr disc methods is shown in FIG. 8, there appeared the absorption peak characteristic of ester amides I, II, and III, and alkyl chains.

Thermal Analysis (TGA-DTA)

Figure 9:
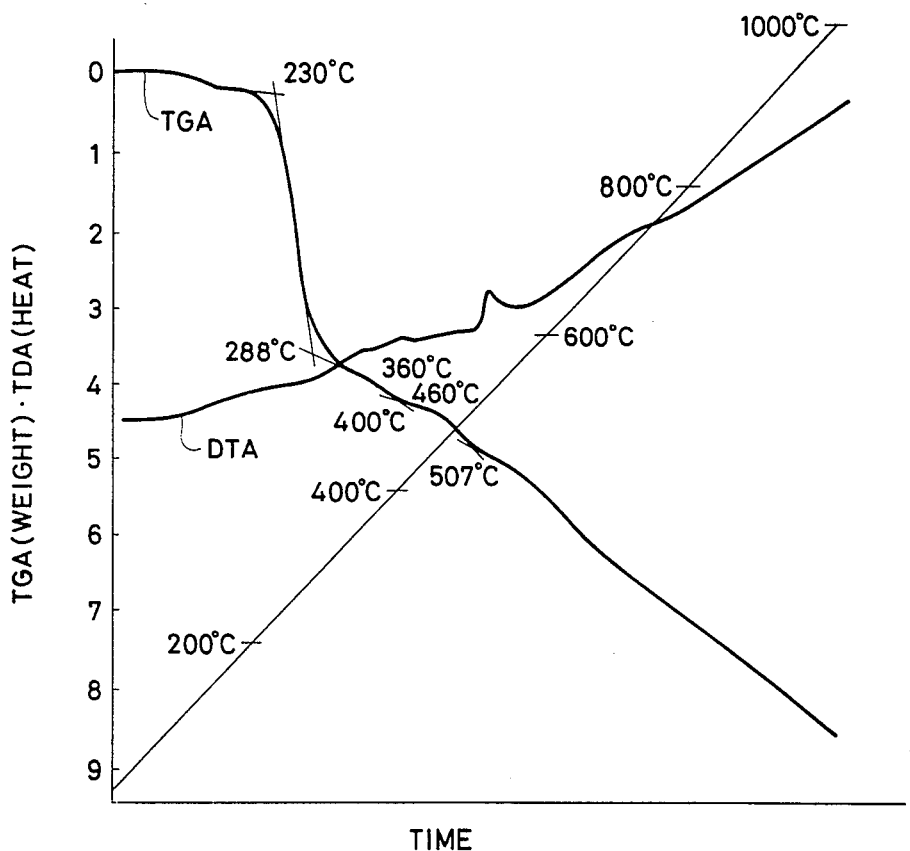
FIG. 9 shows the result of the thermogravimetric analysis.

The result obtained by measuring by the use of an RTG-DTA of type H, manufactured by Rigaku Denki Co., Ltd., under the conditions: TGA full scale, 10 mg, DTA full scale, 100 μv; maximum temperature, 1000° C.; rate of heating, 10° C./min; and nitrogen stream of 30 ml/min is as shown in FIG. 9. In the TGA were observed inflection points at 230°, 288°, 360°, 400°, 460°, and 507° C. and a characteristic peak in the vicinity of 525° C.

Figure 10:
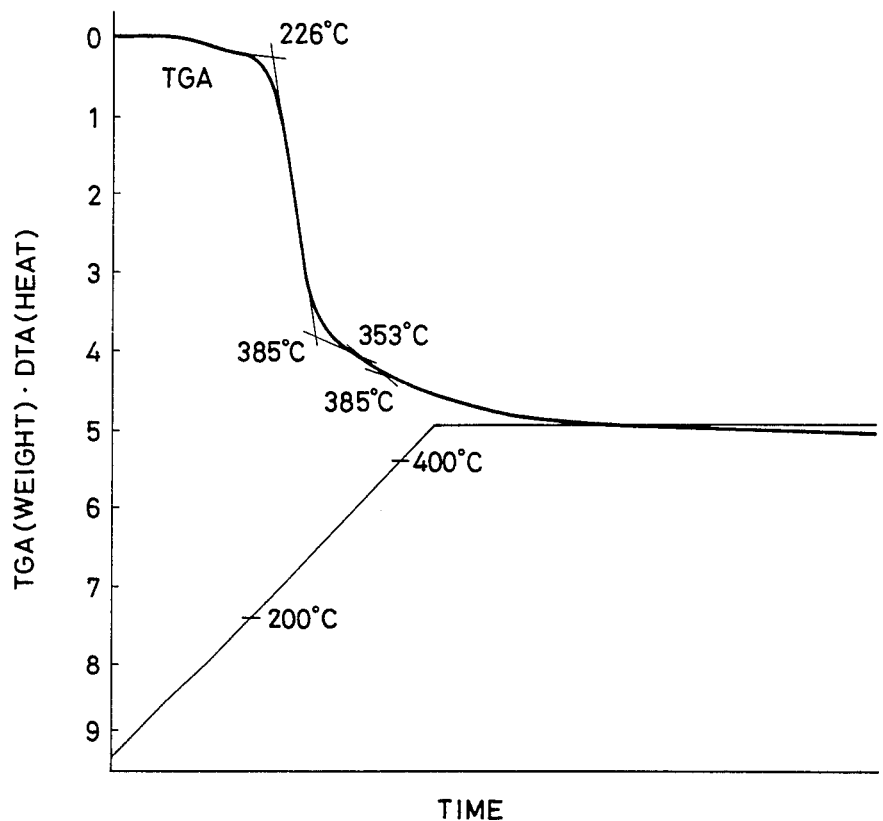
FIG. 10 shows the weight change (TGA) and the heat change (DTA) when the high polymer was heated from room temperature to 450° C. and maintained at that temperature for one hour.

On the other hand, FIG. 10 shows the result obtained when the product was heated up to 450° C. at rate of 10° C./min, and maintained at 450° C. for one hour. Although the weight slowly decreases by heating at 450° C. for one hour, heat-resistant at around 400° to 450° C. may be expected.

In the IR spectrum of the compound which was obtained by the ring closure of the amphiphilic high polymer in this example as above it was confirmed that the absorption resembling that of the imide linkage is observed and the alkyl group disappears. Also, the weight decrease after the heating at 450° C. for one hour is 48.4%, which is in good agreement with the theoretical decrease 50.1% in the case where a ring closure structure is formed by the elimination of stearyl alcohol and water.

Measurement of Molecular Weight by GPC

By GPC measured in a mixture of N,N-dimethylacetamide and chloroform a number average molecular weight of about 16,000 (reduced to polystyrene) was obtained.

The product obtained in this example was dissolved in a 5:5 mixture (volume ratio) of distilled chloroform and distilled dimethylacetamide to prepare 25 ml of LB film spreading solution.

Figure 11:
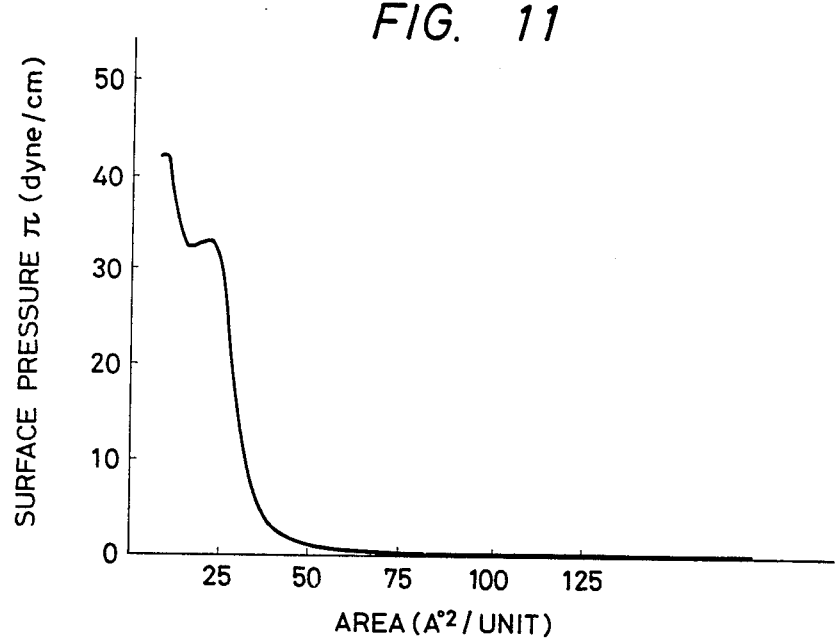
FIG. 11 shows the relationship between surface pressure and area per recurring unit in the case where the amphiphilic high polymer obtained in Example 9 was spread on the surface of water.
Figure 12:
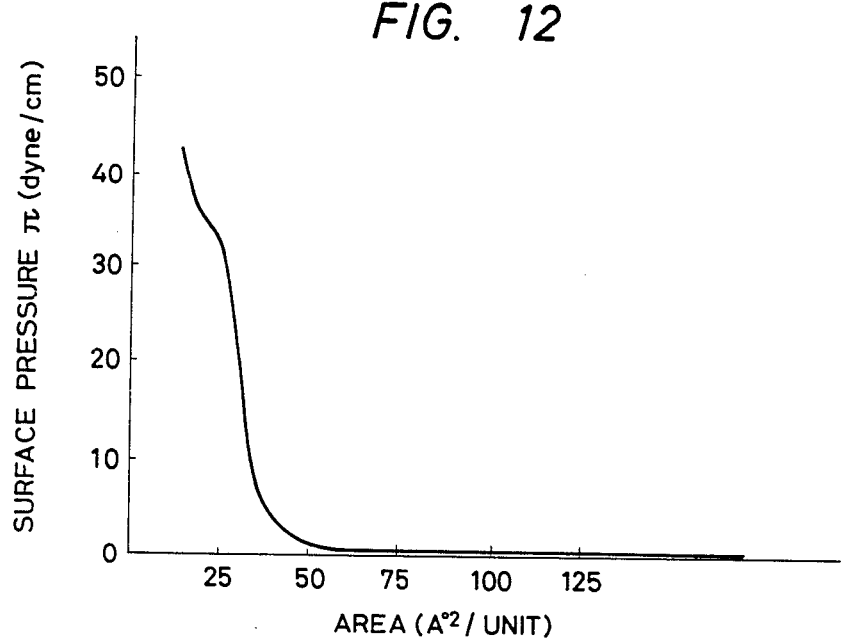
FIG. 12 shows the surface pressure-area curve of said high polymer mixed with an equimolar amount of stearyl alcohol.

The relationship between surface pressure and area per recurring unit was measured at 20° C. on the surface of redistilled water. The result obtained is shown in FIG. 11. The surface pressure rose steeply from ca. 50 Å$^2$/unit, forming a good condensed film. The collapse pressure was 30 dyne/cm. When stearyl alcohol was mixed in an equimolar amount, a good surface pressure-area curve was obtained (FIG. 12).

It was brought to light that when the amphiphilic high polymer in this example mixed with an equimolar amount of stearyl alcohol is built up on the glass substrate on which aluminum was evaporated, a deposited film of Y type was obtained.

In addition the 61 layers deposited film obtained in the above described way had a thickness of ca. 1800 Å, and the electrical insulation characteristic was found to be excellent by the measurement of capacitance.

Further, it was also confirmed from the peaks at 1790 cm$^{-1}$ and 1710 cm$^{-1}$ by FT-IR analysis that when said deposited film was heated at 450° C. for one hour a linkage resembling the imide linkage was formed.

EXAMPLE 10

10.91 g of pyromellitic acid dianhydride and 27.05 g of stearyl alcohol were allowed to react at 120° C. for three hours, and the product was recrystallized from 200 ml of ethanol to give pyromellitic acid distearyl ester of m.p. 133°–137° C.

Synthesis of an Amphiphilic High Polymer from Pyromellitic Acid Distearyl Ester and 2,5-Diaminobenzamide In a 200 ml four neck flask, an acid chloride solution was prepared at room temperature from pyromellitic acid distearyl ester (3.80 g, 5.00 millimoles), thionyl chloride (1.19 g, 10.0 millimoles), and HMPA (50 ml), and thereto was dropwise added 2,5-diaminobenzamide (0.765 g, 5.00 millimoles) dissolved in dimethylacetamide (30 ml) at about 5° C. with stirring by the use of a mechanical stirrer, and stirring was further continued for more than one hour, and then the temperature was slowly restored to room temperature. After the reaction liquid was filtered through Kiriyama filter, similar to Buchner funnel, the filtrate was poured in 500 ml of ethanol, in which a pale yellow precipitate was formed. The precipitate was filtered off, washed first with water and then with ethanol. and dried under a reduced pressure, whereby polyamide (3.55 g, yield 81%) was obtained as a yellow solid.

The results of $^1$H-NMR, IR spectrum analysis, thermal analysis (TGA-DTA) and the measurement of molecular weight by GPC are as follows.

$^1$H-NMR Analysis

Figure 13:
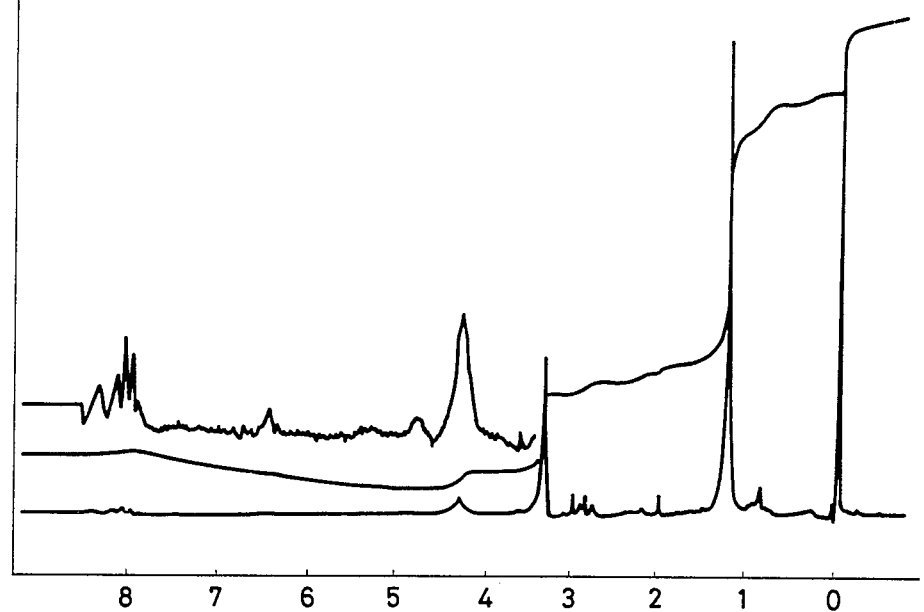
FIGS. 13 and 14 show respectively the ¹H-NMR and IR spectra of the amphiphilic high polymer obtained in Example 10.

The proton NMR spectrum obtained in a solution of DMF-d$_7$+CDCl$_3$ is as shown in FIG. 13.

IR Spectrum Analysis

Figure 14:
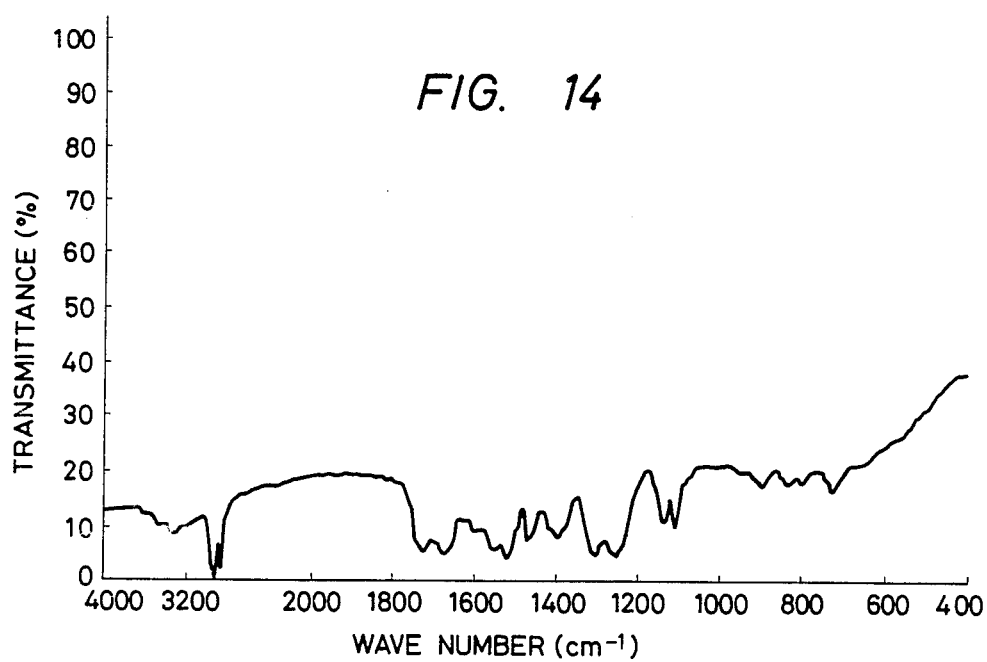

As the IR chart obtained by KBr disc method is shown in FIG. 14, there appeared the absorption peak characteristic of esters, amides I, II, and III, and alkyl chains.

Thermal Analysis (TGA-DTA)

Figure 15:
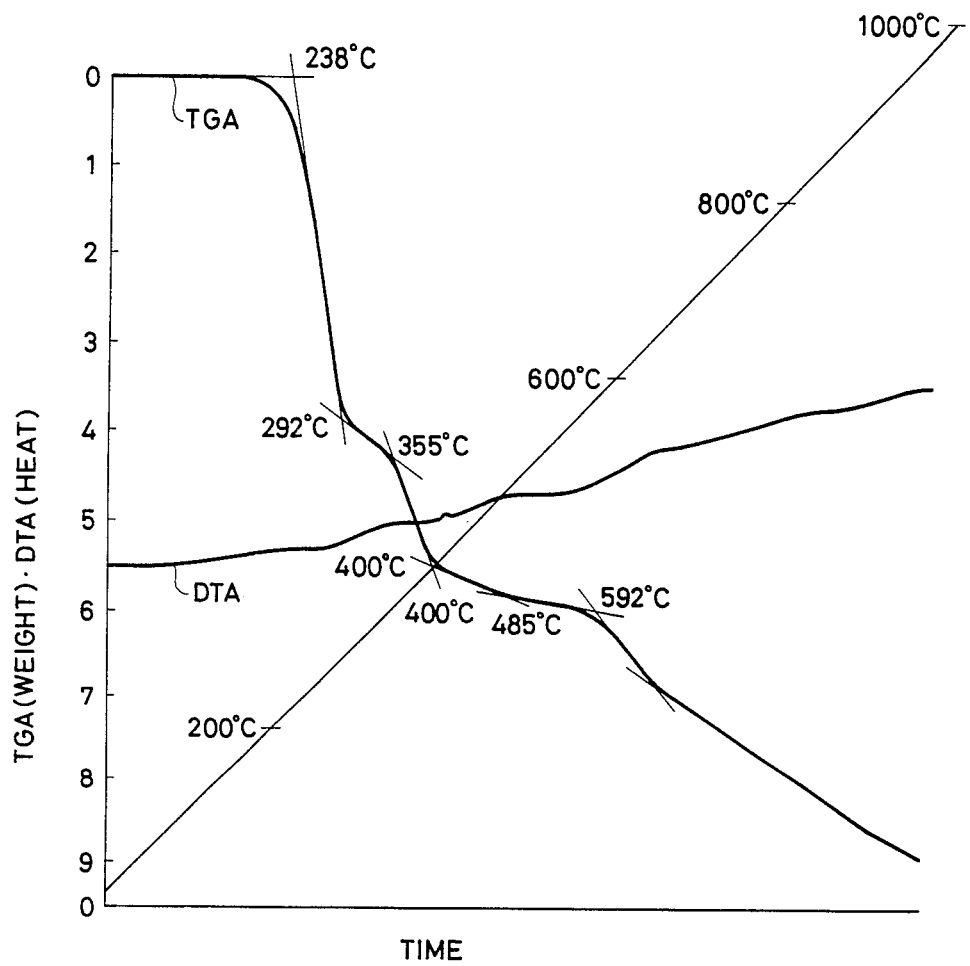
FIG. 15 shows the result of the thermogravimetric analysis.

The result obtained by measuring by the use of an RTG-DTA of type H, manufactured by Rigaku Denki Co., Ltd., under the conditions: TGA full scale, 10 mg; DTA full scale, 1000 μv; maximum temperature, 1000° C; rate of heating, 10° C./min; and nitrogen stream of 30 ml/min is shown in FIG. 15.

In the TGA were observed inflection points at 238°, 292°, 355°, 400°, 485°, and 592° C., and in the DTA was observed no characteristic peak.

Figure 16:
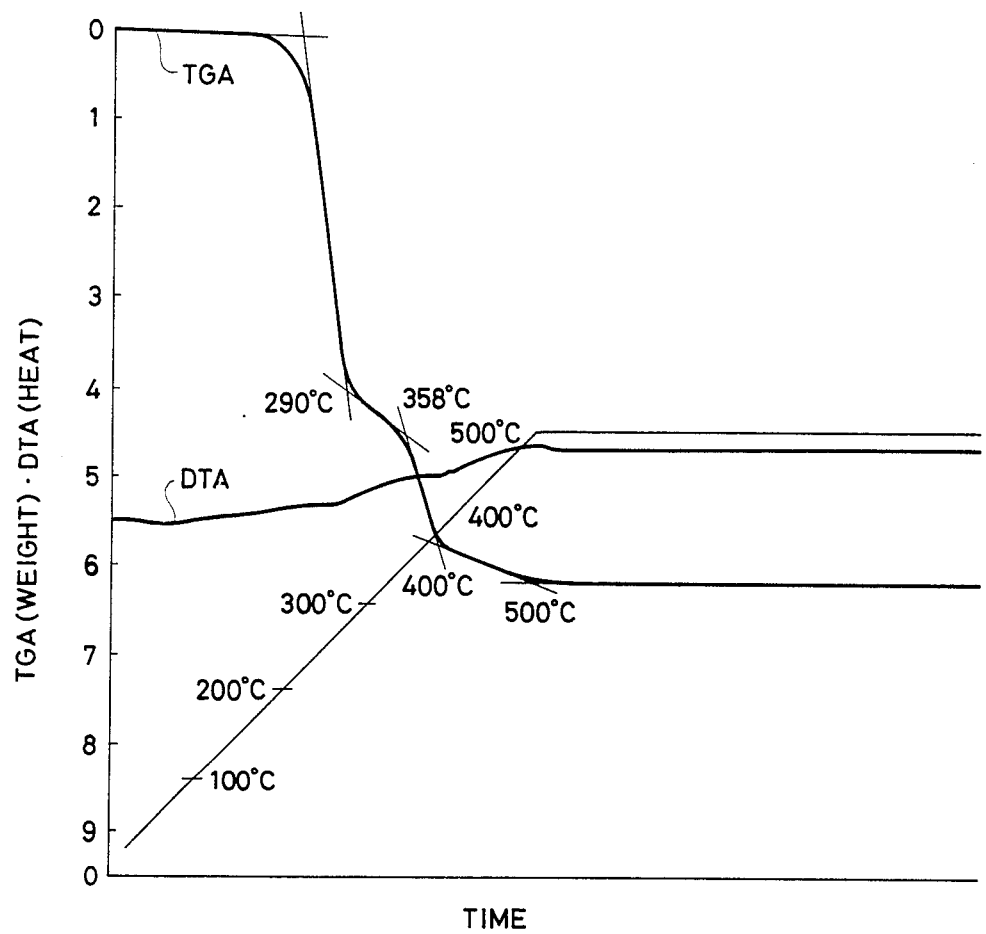
FIG. 16 shows the weight change (TGA) and the heat change (DTA) when said high polymer was heated from room temperature to 500° C. and maintained at that temperature for one hour.

On the other hand, FIG. 16 shows the result obtained when the product was heated up to 500° C. at a rate of 10° C./min, and maintained at 500° C. for one hour. Even when heating was made at 500° C. for one hour, there was found almost no decrease in the weight, indicating the heat stability, so that heat resistance can be expected at a temperature above 500° C.

Figure 17:
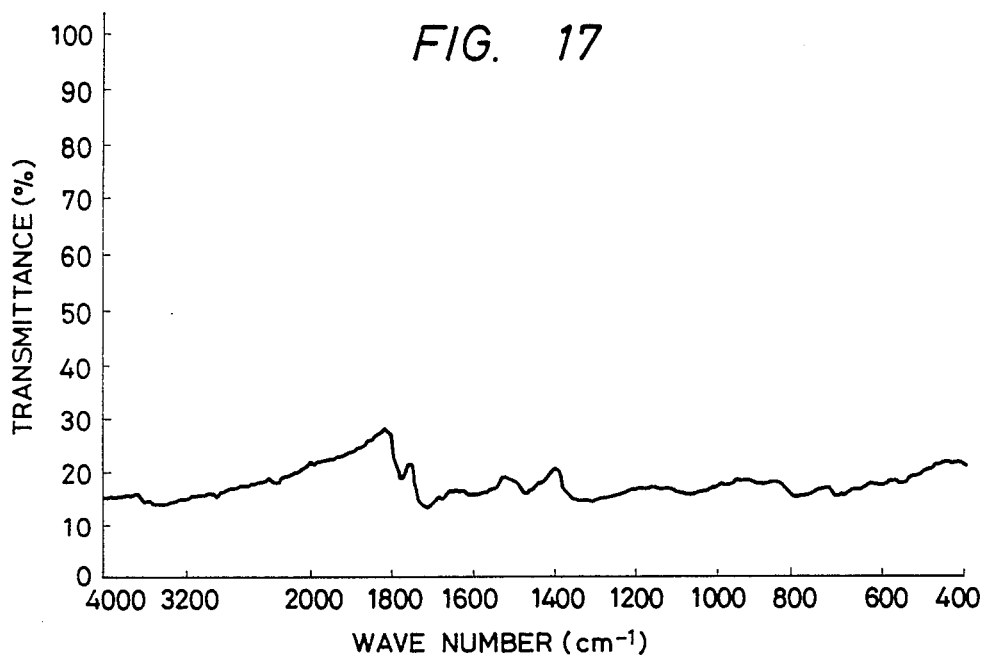
FIG. 17 shows the IR spectrum of the ring closure product obtained by heating at 500° C. for one hour.

Although the IR spectrum of the compound obtained by the ring closure of the amphiphilic high polymer in this example as above is low in the precent transmission as shown in FIG. 17, the absorption resembling that of the imide linkage can be observed. Also, the weight decrease observed after the heating at 500° C. for one hour is 64.7%, which is well in conformity with the theoretical decrease 64.1% in the case where polyimidoisoindroquinazolinedione is formed by the elimination of stearyl alcohol and water.

Measurement of Molecular Weight by GPC

By GPC measured in a mixture of N,N-dimethylacetamide and chloroform a number average molecular weight (reduced to polystyrene) of about 42,000 was obtained.

55.1 g of the product obtained in this example was dissolved in an 8:2 mixture (volume ratio) of distilled chloroform and distilled dimethylacetamide to prepare 25 ml of LB film spreading solution.

Figure 18:
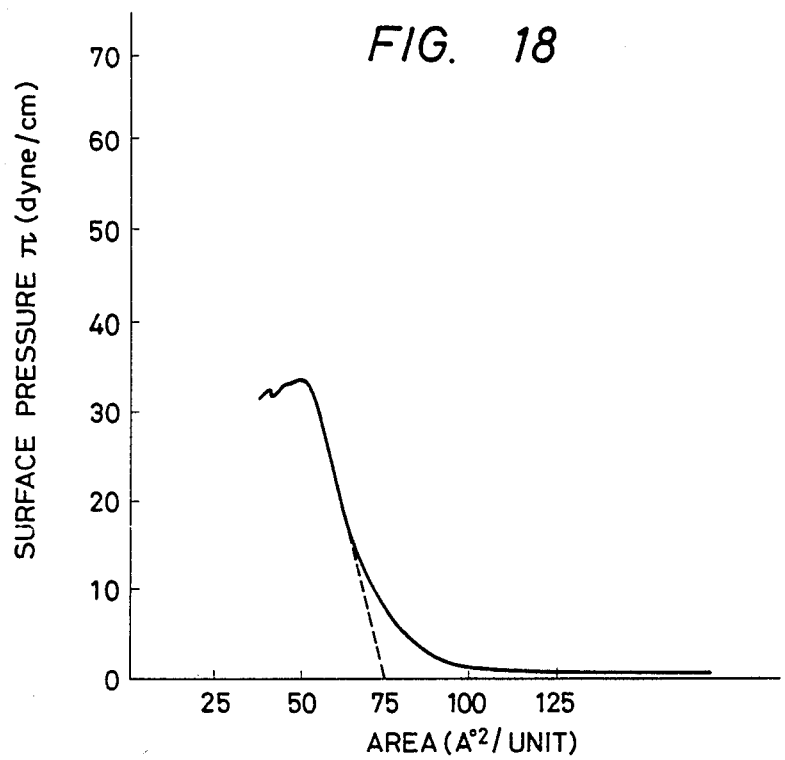
FIG. 18 shows the relationship between surface pressure and area per recurring unit in the case where the amphiphilic high polymer obtained in Example 10 was spread on the surface of water.

The relationship between surface pressure and area per recurring unit was measured at 20° C. on the surface of redistilled water. The result obtained is shown in FIG. 18. The surface pressure rose steeply from about 90 Å$^2$/unit, forming a good condensed film. The limiting area was 75 Å$^2$/unit, and the collapse pressure was 30 dyne/cm.

Figure 19:
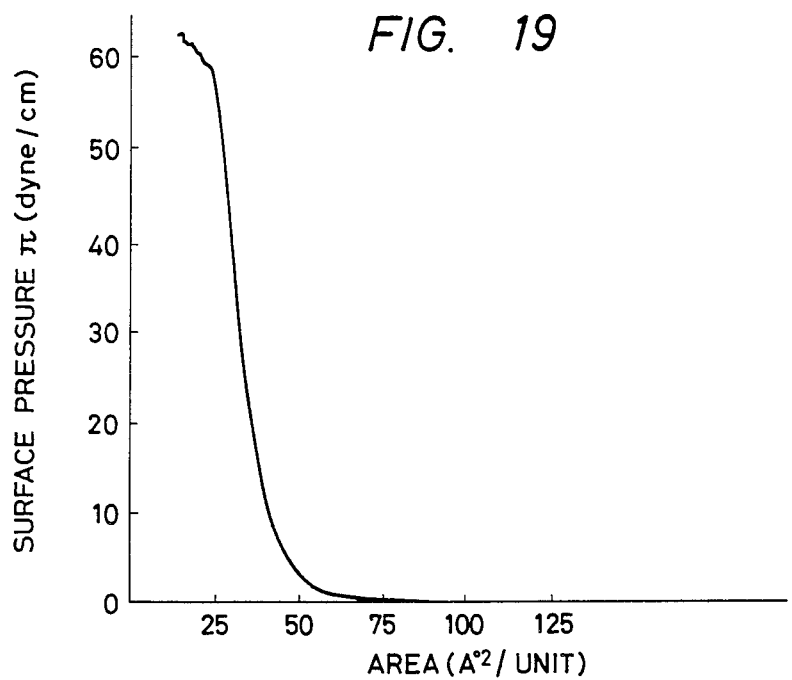
FIG. 19 shows the surface pressure-area curve of said high polymer mixed with an equimolar amount of stearyl alcohol.

When mixed with an equimolar amount of stearyl alcohol, there was obtained an extremely good surface pressure-area curve (FIG. 19).

It was brought to light that when the amphiphilic high polymer in this example mixed with an equimolar amount of stearyl alcohol was deposited on the glass substrate on which aluminum was vacuum evaporated a deposited film of Y type was obtained.

In addition the 61 layers accumulated film obtained in the above described way had a thickness of ca. 1800 Å, and the electric insulation characteristic was found to be excellent by the measurement of capacitance.

Further, it was also confirmed from the peaks at 1790 cm$^{-1}$ and 1710 cm$^{-1}$ by FT-IR analysis that when said accumulated film is heated at 500° C. for one hour, a linkage resembling the imide linkage is formed.

EXAMPLE 11

10.91 g of pyromellitic acid dianhydride and 27.05 g of stearyl alcohol were allowed to react at 120° C. for three hours, and the product was recrystallized from 200 ml of ethanol to give pyromellitic acid distearyl ester of m.p. 133°–137° C.

Synthesis of an Amphiphilic High Polymer from Pyromellitic Acid Distearyl Ester and 3,3-diaminobenzidin In a 200 ml four neck flask an amount (2.84 g, 3.74 millimoles) of pyromellitic acid distearyl ester was weighed out and dissolved in hexamethylphosphoric triamide (HMPA, 30 ml). When thionyl chloride (0.87 g, 7.48 millimoles) was dropwise added at 5° C. under a stream of nitrogen with stirring by the use of a mechanical stirrer, and further the stirring was continued for one hour, a pale yellow pasty acid chloride was obtained. By adding 30 to 40 ml of methylene chloride (dried with calcium chloride) the solution was made homogeneous. In a separate 200 ml four neck flask, 3,3'-diaminobenzidin (0.800 g, 3.74 millimoles) was dissolved in dimethylacetamide (30 ml), and the above described solution of acid chloride was dropped in this solution over about 30 minutes at about 5° C. in a stream of nitrogen with stirring by the use of a mechanical stirrer. After stirring for an additional three hours the temperature was slowly restored to room temperature. After the reaction was complete, by pouring the reaction mixture in 500 ml of ethanol with stirring by the use of a mechanical stirrer, a pale yellow precipitate was deposited. When the precipitate was filtered through Kiriyama filter, washed with water and then with ethanol, and dried under a reduced pressure, 0.91 g (yield 26%) of amphiphilic high polymer was obtained.

The results of $^1$H-NMR, IR spectrum analysis, thermal analysis (TGA-DTA), and the measurement of molecular weight by GPC are as follows.

$^1$H-NMR Analysis

The proton NMR spectrum obtained in a solution of DMF-$d_7$+CDCl$_3$ was assigned as follows:
δ1.20 (m, 70H CO$_2$CH$_2$C$_{17}$H$_{35}$)
δ4.25 (t, 4H CO$_2$CH$_2$C$_{17}$H$_{35}$)
δ7.95–8.25 (m, 8H Aromatic)
The proton of CONH could not be observed.

IR Spectrum Analysis

Figure 20:
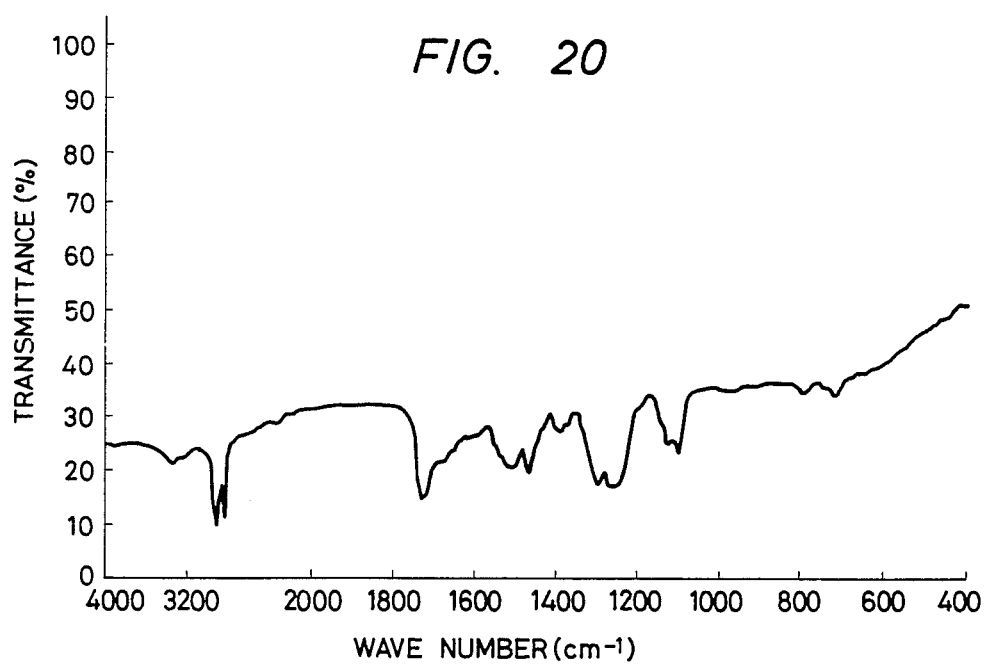
FIG. 20 shows the IR spectrum of the amphiphilic high polymer obtained in Example 11.

As the IR chart obtained by KBr disc method is shown in FIG. 20, there appeared the characteristic absorptions of esters, amides I, II, and III, and alkyl chains.

Thermal Analysis (TGA-DTA)

Figure 21:
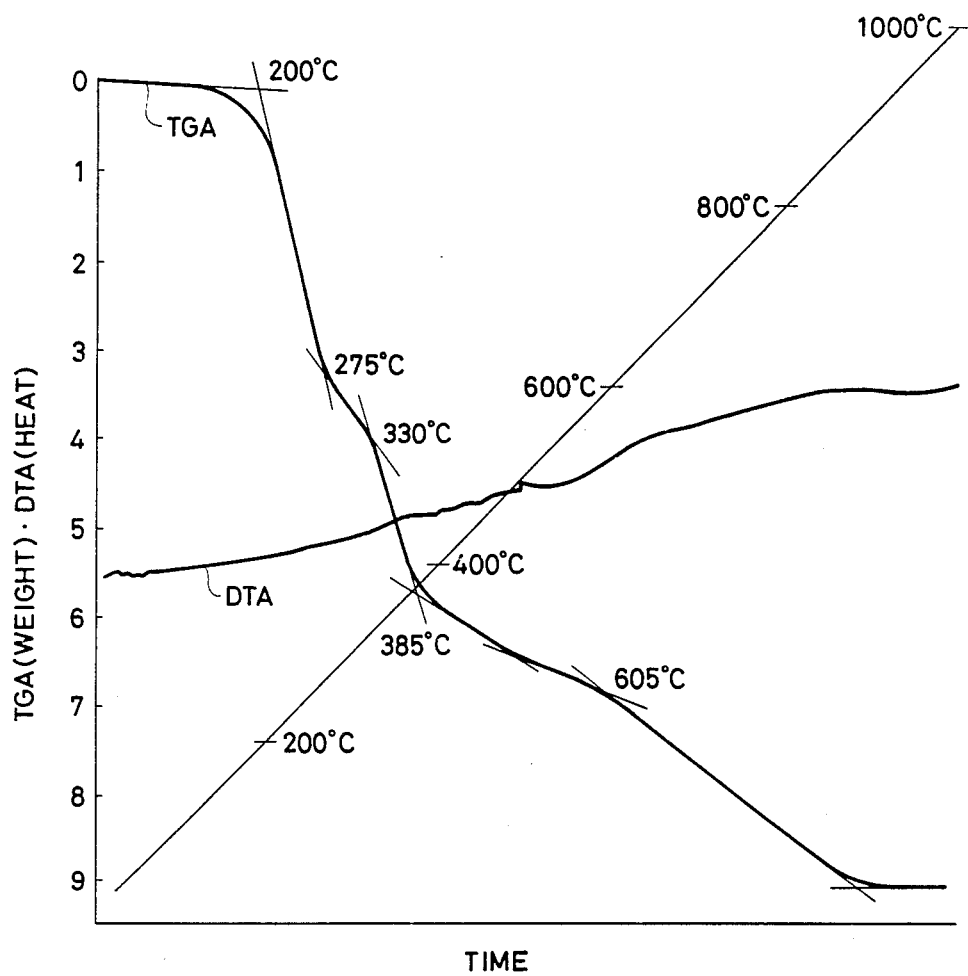
FIG. 21 shows the result of the thermogravimetric analysis.

The result obtained by measuring by the use of an RTG-DTA of type H, manufactured by Rigaku Denki Co., Ltd., under the conditions: TGA full scale, 10 mg; DTA full scale, 100 μv; maximum temperature, 1000° C; rate of heating, 10° C./min; and nitrogen stream of 30 ml/min is as shown in FIG. 21.

In the TGA were observed inflection points at 200°, 275°, 330°, 385°, and 605° C., and in the DTA was observed no characteristic peak.

Figure 22:
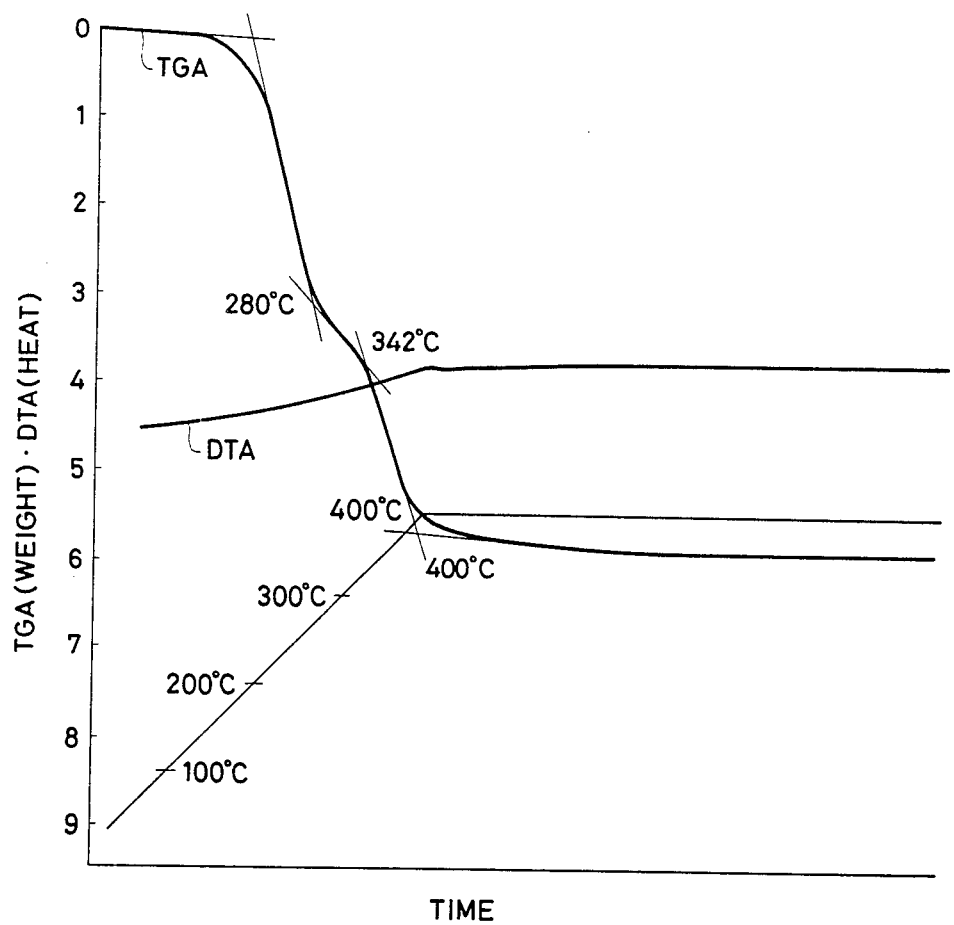
FIG. 22 shows the weight change (TGA) and the heat change (DTA) when said high polymer was heated from room temperature to 400° C. and maintained at that temperature for one hour.

On the other hand, FIG. 22 shows the result obtained when the product was heated up to 400° C. at a rate of 10° C./min, and maintained at 400° C. for one hour. By heating at 400° C. for one hour an almost constant weight was attained. Heat resistance may be expected up to about 400° to 450° C.

In the IR spectrum of the compound which was obtained by the ring closure of the amphiphilic high polymer in this example as above it was confirmed that the absorption resemling that of the imide linkage is observed and the alkyl group disappears. Also, the weight decrease after the heating at 400° C. for one hour is 65.0%, which is substantially in conformity with the theoretical decrease 61.7% in the case where a ring closure structure is formed by the elimination of stearyl alcohol and water.

Measurement of Molecular Weight by GPC

By GPC measured in a mixture of N,N-dimethylacetamide and chloroform a number average molecular weight (reduced to polystyrene) of about 28,000 was obtained.

The product obtained in this example was dissolved in an 8:2 mixture (volume ratio) of distilled chloroform and distilled dimethylacetamide to prepare 25 ml of LB film spreading solution.

Figure 23:
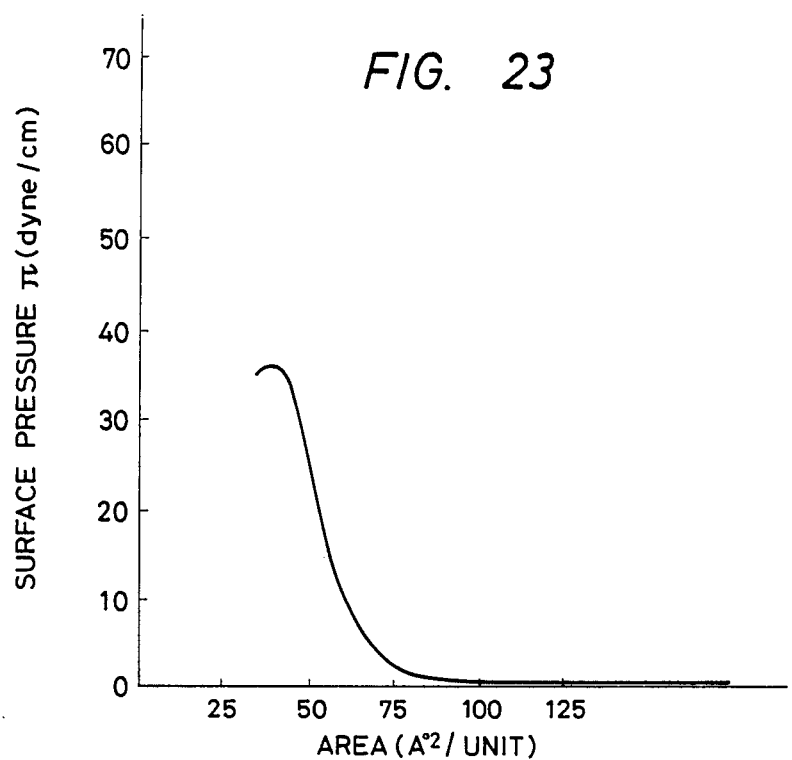
FIG. 23 shows the relationship between surface pressure and area per recurring unit in the case where the amphoteric high polymer obtained in Example 11 was spread on the surface of water.

The relationship between surface pressure and area per recurring unit was measured at 20° C. on the surface of twice-distilled water, and the result obtained is as shown in FIG. 23. The surface pressure rose steeply from about 75 Å$^2$/unit, forming a good condensed film. The limiting area was 63 Å$^2$/unit and the collapse pressure was 35 dyne/cm.

Figure 24:
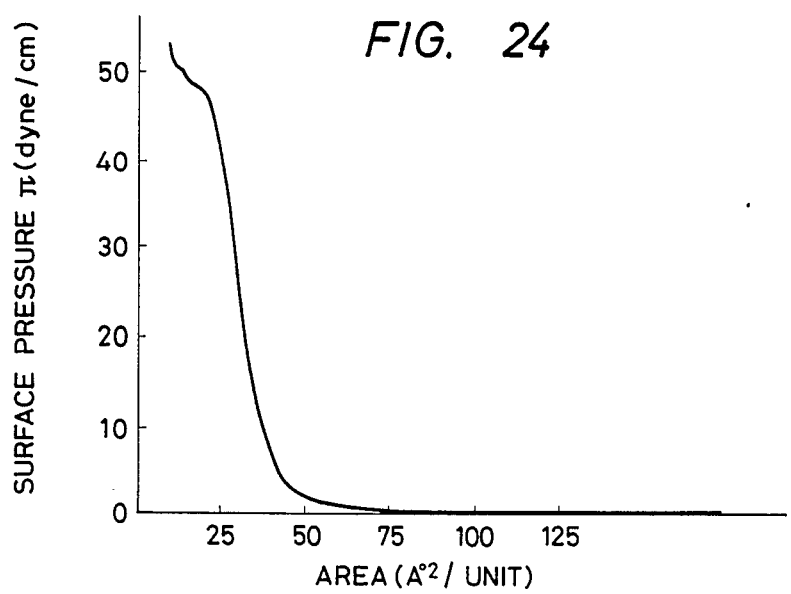
FIG. 24 shows the surface pressure-area curve of said high polymer mixed with an equimolar amount of stearyl alcohol.

When mixed with an equimolar amount of stearyl alcohol an extremely good surface pressure-area curve was obtained (FIG. 24).

It was brought to light that when the amphiphilic high polymer in this example mixed with an equimolar amount of stearyl alcohol was deposited on the glass substrate on which aluminum was vacuum evaporated an deposited film of Y type was obtained.

In addition, the 61 layers accumulated film obtained in the above described way had a thickness of ca. 1800 Å, and the insulation characteristic was found to be excellent by the measurement of capacitance.

Further, it was also confirmed from the peaks at 1790 cm$^{-1}$ and 1710 cm$^{-1}$ by FT-IR analysis that when said accumulated film is heated at 400° C. for one hour, a linkage resembling the imide linkage is formed.

As described above, according to the present invention, it is possible to form, on the surface of water more stable films of so modified polymer to be capable of film formation by the Langmuir-Blodgett process, and to build up the film on a substrate in a better state. In addition, it is possible to produce a very thin film having such a thickness which is conventionally difficult to obtain as not more than 10,000 Å or, if desired, 10 to 1,000 Å, excellent in heat resistance and having a high chemical resistance and good mechanical properties by partial or complete cyclization, at the same time by removing the known LB film compound which has been mixed with the high polymer.

While the invention has been described in detail and with reference to specific embodiments thereof, it will be apparent to one skilled in the art that various changes and modifications can be made therein without departing from the spirit and scope thereof.

What is claimed is:

1. A process for forming a film comprising the step of forming a built-up film of a mixture of a high polymer and a known Langmuir-Blodgett film compound by the Langmuir-Blodgett process, said high polymer including linear recurring units each of which is composed of an at least divalent first organic group R$_1$ having at least two carbon atoms and an at least divalent second organic group R$_2$ having at least two carbon atoms, said first organic group R$_1$ and said second organic group R$_2$ being connected with each other by a divalent bonding group, and at least one hydrocarbon-containing group R$_3$ which have 10 to 30 carbon atoms and optionally contain a substituent group, and which is covalently bonded to the same recurring units.

2. A process for forming a film according to claim 1, wherein said high polymer includes two hydrocarbon-containing groups R$_3$ per recurring unit.

3. A process for forming a film according to claim 1, wherein one or both of said first and second organic groups R$_1$ and R$_2$ are benzenoid groups having at least six carbon atoms.

4. A process for forming a film according to claim 2, wherein one or both of said first and second organic groups $R_1$ and $R_2$ are benzenoid groups having at least six carbon atoms.

5. A process for forming a film according to claim 1, wherein said hydrocarbon-containing group $R_3$ contains an aliphatic group, a connecting group of an alicyclic group and an aliphatic group, a connecting group of an aromatic group and an aliphatic group, or a substituent thereof.

6. A process for forming a film according to claim 2, wherein said hydrocarbon-containing group $R_3$ contains an aliphatic group, a connecting group of an alicyclic group and an aliphatic group, a connecting group of an aromatic group and an aliphatic group, or a substituent thereof.

7. A process for forming a film according to claim 1, wherein said recurring unit is provided with a precursor structure for producing a five-membered or six-membered ring containing a hetero-atom.

8. A process for forming a film according to claim 2, wherein said recurring unit is provided with a precursor structure for producing a five-membered or six-membered ring containing a hetero-atom.

9. A process for forming a film according to claim 3, wherein said recurring unit is provided with a precursor structure for producing a five-membered or six-membered ring containing a hetero-atom.

10. A process for forming a film according to claim 4, wherein said recurring unit is provided with a precursor structure for producing a five-membered or six-membered ring containing a hetero-atom.

11. A process for forming a film according to claim 1, wherein further comprising the step of producing said five-membered or six-membered ring containing a hetero-atom by heating said built-up film.

12. A process for forming a film according to claim 1, wherein said hydrocarbon-containing group $R_3$ has 14 to 22 carbon atoms.

13. A process for forming a film according to claim 2, wherein said hydrocarbon-containing group $R_3$ has 14 to 22 carbon atoms.

14. A process for forming a film according to claim 3, wherein said hydrocarbon-containing group $R_3$ has 14 to 22 carbon atoms.

15. A process for forming a film according to claim 5, wherein said hydrocarbon-containing group $R_3$ has 14 to 22 carbon atoms.

16. A process for forming a film according to claim 7, wherein said hydrocarbon-containing group $R_3$ has 14 to 22 carbon atoms.

17. A process for forming a film according to claim 11, wherein said hydrocarbon-containing group $R_3$ has 14 to 22 carbon atoms.

18. A process for forming a film according to claim 1, wherein said known Langmuir-Blodgett film compound is composed of a hydrocarbon group having 14 to 22 carbon atoms and a hydrophilic group.

19. A process for forming a film according to claim 2, wherein said known Langmuir-Blodgett film compound is composed of a hydrocarbon group having 14 to 22 carbon atoms and a hydrophilic group.

20. A process for forming a film according to claim 3, wherein said known Langmuir-Blodgett film compound is composed of a hydrocarbon group having 14 to 22 carbon atoms and a hydrophilic group.

21. A process for forming a film according to claim 5, wherein said known Langmuir-Blodgett film compound is composed of a hydrocarbon group having 14 to 22 carbon atoms and a hydrophilic group.

22. A process for forming a film according to claim 7, wherein said known Langmuir-Blodgett film compound is composed of a hydrocarbon group having 14 to 22 carbon atoms and a hydrophilic group.

23. A process for forming a film according to claim 11, wherein said known Langmuir-Blodgett film compound is composed of a hydrocarbon group having 14 to 22 carbon atoms and a hydrophilic group.

24. A process for forming a film according to claim 12, wherein said known Langmuir-Blodgett film compound is composed of a hydrocarbon group having 14 to 22 carbon atoms and a hydrophilic group.

* * * * *

UNITED STATES PATENT AND TRADEMARK OFFICE
CERTIFICATE OF CORRECTION

PATENT NO. : 4,740,396
DATED : April 26, 1988
INVENTOR(S) : Masakazu UEKITA et al It is certified that error appears in the above-identified patent and that said Letters Patent is hereby corrected as shown below:

Column 3, line 47, "X represents C or Br" should read --X represents Cl or Br--.

Column 4, lines 46 to 63, each occurrence of "$R_4$" should read --$R_3$--.

Column 12, lines 60 to 64, " 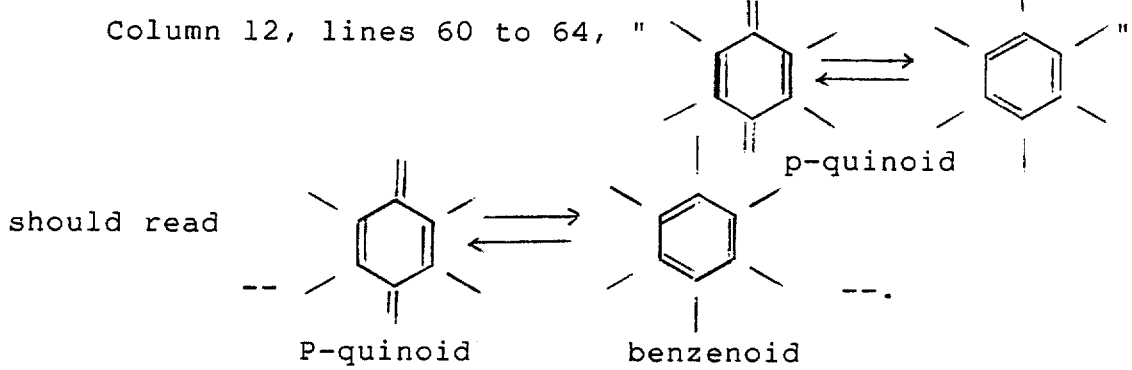 " should read

-- 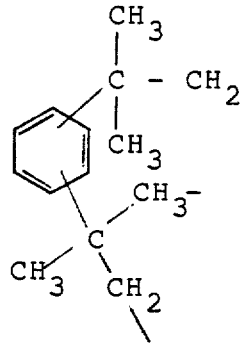 --.

Column 13, lines 35 to 45, " 
$$\begin{array}{c} CH_3 \\ | \\ C - CH_2 \\ | \\ CH_3 \end{array}$$
 " should read

UNITED STATES PATENT AND TRADEMARK OFFICE
CERTIFICATE OF CORRECTION

PATENT NO. : 4,740,396
DATED : April 26, 1988
INVENTOR(S) : Masakazu UEKITA et al It is certified that error appears in the above-identified patent and that said Letters Patent is hereby corrected as shown below:

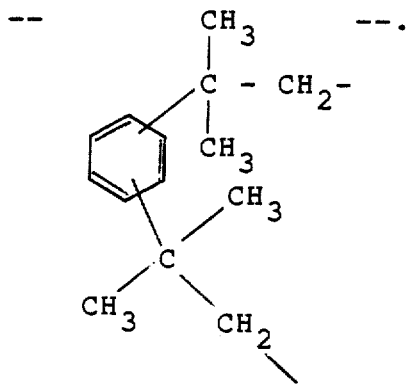

Column 22, line 45, "$R_5$" should read --$R_4$--.

Signed and Sealed this

Twenty-first Day of February, 1989

Attest:

DONALD J. QUIGG

Attesting Officer     Commissioner of Patents and Trademarks